United States Patent
Maruyama et al.

(10) Patent No.: US 9,025,172 B2
(45) Date of Patent: May 5, 2015

(54) PRINTING SETTING APPARATUS, COMPUTER READABLE RECORDING MEDIUM, AND IMAGE FORMING SYSTEM FOR GENERATING PRINTING SETTING INFORMATION DESCRIBED IN ONE DATA FORMAT INCLUDED IN PLURAL TYPES OF DATA FORMATS AND SUBMITTING A PRINTING JOB TO AN IMAGE FORMING APPARATUS CAPABLE OF EXECUTING A PRINTING JOB BASED ON PRINTING SETTING INFORMATION DESCRIBED IN THE PLURAL TYPES OF DATA FORMATS

(71) Applicant: Konica Minolta, Inc., Chiyoda-ku (JP)

(72) Inventors: Tomoko Maruyama, Toyokawa (JP); Atsushi Tomita, Toyohashi (JP); Mie Kawabata, Toyokawa (JP); Hiroshi Sugiura, Toyokawa (JP); Toshimi Shinchi, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/953,795

(22) Filed: Jul. 30, 2013

(65) Prior Publication Data
US 2014/0029035 A1 Jan. 30, 2014

(30) Foreign Application Priority Data
Jul. 30, 2012 (JP) .................................. 2012-168048

(51) Int. Cl.
G06F 3/12 (2006.01)
G06K 15/00 (2006.01)
G06F 3/048 (2013.01)

(52) U.S. Cl.
CPC ............ *G06F 3/1297* (2013.01); *G06F 3/1205* (2013.01); *G06F 3/1253* (2013.01); *G06F 3/1285* (2013.01); *G06F 3/048* (2013.01)

(58) Field of Classification Search
USPC ............ 358/1.13, 1.15, 1.14, 1.16, 1.18, 1.6, 358/1.9, 3.28, 462, 402, 403; 709/206, 230, 709/220, 201, 203, 223, 246, 224; 707/723, 707/724, 728, 731, 607, 609, 608
See application file for complete search history.

(56) References Cited

U.S. PATENT DOCUMENTS 7,259,886 B2 * 8/2007 Iwase et al. .................. 358/1.15
8,749,811 B2 * 6/2014 Kim et al. .................... 358/1.15

(Continued)

FOREIGN PATENT DOCUMENTS

| JP | 2001-345989 | 12/2001 |
| JP | 2002-176450 | 6/2002 |

(Continued)

OTHER PUBLICATIONS

Office Action issued in corresponding Japanese Patent Application No. 2012-168048, issued Dec. 2, 2014, and English translation thereof.

*Primary Examiner* — Ngon Nguyen
(74) *Attorney, Agent, or Firm* — Buchanan Ingersoll & Rooney PC

(57) ABSTRACT

A printing setting apparatus for generating printing setting information described in one data format included in plural types of data formats and submitting a printing job to an image forming apparatus capable of executing a printing job based on printing setting information described in said plural types of data formats, comprising: an operation acceptor for accepting a user's operation for input; a generator for making printing setting based on control information received by said operation acceptor and generating printing setting information described in said one data format based on said printing setting; a converter for converting said printing setting information described in said one data format into printing setting information described in another data format included in said plural types of data formats; and an output part for outputting said printing setting information which is generated by said converter and described in said another data format.

20 Claims, 21 Drawing Sheets

(56) References Cited

U.S. PATENT DOCUMENTS

| | | | |
|---|---|---|---|
| 2005/0270569 A1* | 12/2005 | Hayashi | 358/1.15 |
| 2009/0021757 A1* | 1/2009 | Liu et al. | 358/1.13 |
| 2009/0158277 A1* | 6/2009 | Bunker | 718/100 |
| 2009/0265438 A1* | 10/2009 | Podl | 709/206 |
| 2012/0011426 A1* | 1/2012 | Yach | 715/208 |
| 2012/0026535 A1* | 2/2012 | Rovner et al. | 358/1.15 |
| 2012/0218576 A1* | 8/2012 | Sekine et al. | 358/1.13 |

FOREIGN PATENT DOCUMENTS

| | | |
|---|---|---|
| JP | 2006-146388 | 6/2006 |
| JP | 2008-258796 | 10/2008 |
| JP | 2010-050787 | 3/2010 |
| JP | 2011-86996 A | 4/2011 |
| JP | 2011-155392 | 8/2011 |

* cited by examiner

IMAGE FORMING SYSTEM 1

Fig. 3A

```
4(5)
      27a        27b                                G1
  ┌─────────┬─────────┐
  │ SAVING  │ READOUT │
  │OF SETTING│OF SETTING│
  └─────────┴─────────┘
  COPY                        THE NUMBER OF COPIES 4
  ─────────────────────────────────────────────────
  COLOR      PAPER SIZE    OUTPUT MODE    INTEGRATION

AUTOMATIC  AUTOMATIC     SIMPLEX→SIMPLEX    NO
             SELECTION

▓FULL▓     ▓A 4▓         ▓SIMPLEX→DUPLEX▓   ▓2in1▓

BLACK      A 3           DUPLEX→DUPLEX      4in1

MONOCHROME B 4           DUPLEX→SIMPLEX     8in1

FINISH                         OK         CANCEL
```

Fig. 3B

PRINTING SETTING INFORMATION  D1

COLOR : FULL
PAPER SIZE : A 4
OUTPUT MODE : DUPLEX
INTEGRATION : 2 in 1
THE NUMBER OF COPIES : 4
FINISH : STAPLING AT LEFT CORNER

PRINTING SETTING INFORMATION D2

```
·%-12345X@PJL JOB
@PJL COMMENT
@PJL SET JOBNAME="test.txt"
@PJL SET QTY = 4
@PJL SET DRIVERCOLORSELECT = COLOR
@PJL SET PAPER = A4
@PJL SET INFONIN1 = N2
@PJL SET DUPLEX = ON
@PJL SET FINISH = LEFT1POINT
        ·
        ·
        ·
```

PRINTING SETTING INFORMATION D3

```
function=PS_PRINT&PrintNO=4&DUPLEX=On&COLOR=
Color&STAPLE=OnePointLeft&NIN1=2in1&SPR=OFF
    ⋮
```

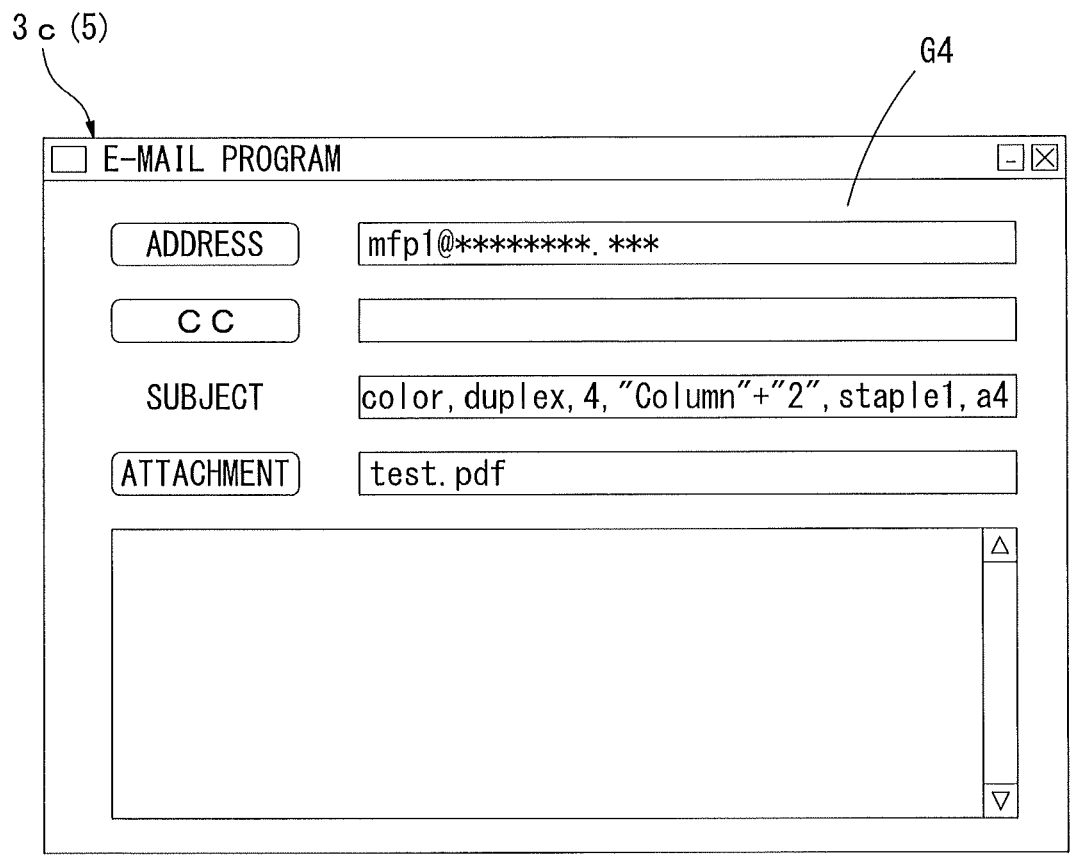

PRINTING SETTING APPARATUS, COMPUTER READABLE RECORDING MEDIUM, AND IMAGE FORMING SYSTEM FOR GENERATING PRINTING SETTING INFORMATION DESCRIBED IN ONE DATA FORMAT INCLUDED IN PLURAL TYPES OF DATA FORMATS AND SUBMITTING A PRINTING JOB TO AN IMAGE FORMING APPARATUS CAPABLE OF EXECUTING A PRINTING JOB BASED ON PRINTING SETTING INFORMATION DESCRIBED IN THE PLURAL TYPES OF DATA FORMATS

This application is based on application No. 2012-168048 filed in Japan, the contents of which are hereby incorporated by reference.

BACKGROUND OF THE INVENTION

1. Field of the Invention

The present invention relates to a printing setting apparatus, a computer readable recording medium, and an image forming system.

2. Description of the Background Art

An image forming apparatus such as a multifunction peripheral (MFP) used in a network environment is designed such that an image is formed on a printing medium such as a printing paper to produce printouts through execution of a printing job submitted in accordance with a user's instruction. According to the conventional arts, information about setting such as printing setting which is used in the foregoing type of image forming apparatus is centrally controlled, to thereby cause the same printing setting to be reflected also in a different apparatus. For example, according to the technique suggested by Japanese Patent Application Laid-Open No. 2011-86996, an image forming apparatus transmits information about setting such as printing setting to a server via an e-mail, so that the information about setting is centrally controlled in the server.

However, in a case where the information about setting controlled in the server is described in a different data format from a data format which can be interpreted by a different apparatus, the above-described technique is faced with a problem that even if the different apparatus acquires information about setting from the server, printing setting based on the acquired information about setting cannot be correctly reflected.

In recent years, various user interfaces are available as user interfaces for a user to submit a printing job to an image forming apparatus, and thus, in some cases, information about printing setting is generated in different data formats varying with the various user interfaces.

For example, in a case where a user gives an instruction for execution of a printing job by the user's direct operation of an image forming apparatus, an operation panel included in the image forming apparatus serves as a user interface. In this case, the user performs an operation for setting of various printing conditions on a setting page displayed on the operation panel, so that printing setting corresponding to the operation performed by the user is reflected in the setting page. At that time, the image forming apparatus generates information about printing setting in a specific data format based on the operation performed on the operation panel therein.

Also, in a case where a user gives an instruction for execution of a printing job by operating a computer (PC) connected to a network, a printer driver previously installed in the computer is activated, so that a displayed page provided by the printer driver serves as a user interface. In this case, the printer driver generates information about printing setting in a data format defined by a printer job language (PJL) or the like in accordance with an operation performed by the user.

Unlike this, in a case where a printer driver is not previously installed in a computer, a user first opens a web browser of the computer. Then, accessing a uniform resource locator (URL) of a web application offered by an image forming apparatus allows the user to use a displayed page provided by the web application, as a user interface. In this case, the image forming apparatus generates information about printing setting in a data format defined by a common gateway interface (CGI) of a hypertext transfer protocol (HTTP).

Further, recent image forming apparatuses include a type which is ready to receive an e-mail message via a network and is equipped with an e-mail printing function. More specifically, when an e-mail is received via a network, an image forming apparatus of this type prints out contents of an attached file or the like of the received e-mail. Thus, a user can submit a printing job to an image forming apparatus by starting up an e-mail program in a computer, a mobile data terminal, or the like, and sending an e-mail to an address of the image forming apparatus. In this case, a displayed page provided by starting up the e-mail program serves as a user interface, and printing setting can be accomplished by inputting a text command for requesting printing setting, in a subject space or the like of the e-mail.

However, a user who uses an image forming apparatus is not necessarily accustomed to using all of various user interfaces cited above. Rather than that, typically, a user uses only one user interface, or two user interfaces at most, on a daily basis, and does not intimately understand what operation should be performed on the other user interfaces in order to achieve desired printing setting. Therefore, in submitting a printing job with the use of a different user interface from a user's accustomed user interface, an operation for achieving printing setting cannot be efficiently performed. Also, as a user does not usually use, and thus is unfamiliar with, the different user interface, there is a possibility of incorrect printing setting which is different from desired printing setting.

In order to avoid the above-described situation, it is desired that printing setting made in a user interface which a user usually uses and is accustomed to use is reflected in an unaccustomed user interface as it is. However, according to the conventional art, as is made clear from the above description, in a case where respective data formats used in various user interfaces vary, information about printing setting generated in one user interface cannot be properly read out and displayed by another user interface. Therefore, the conventional art suffers from the problem of poor operability.

Particularly, when a user submits a printing job with the use of an e-mail printing function of an image forming apparatus, the user needs to manually input a text command for requesting printing setting into a subject space or the like of an e-mail in order to achieve printing setting, as described above. This causes a problem that a user who does not know a text command would have difficulties in even using an e-mail printing function of an image forming apparatus.

SUMMARY OF THE INVENTION

It is an object of the present invention to solve the above-described problems. The present invention provides a printing setting apparatus, a computer readable recording medium, and an image forming system which allow for easy and efficient printing setting even in a case where a user is not accustomed to an operation for printing setting.

The present invention is directed to a printing setting apparatus for generating printing setting information described in one data format included in plural types of data formats and submitting a printing job to an image forming apparatus capable of executing a printing job based on printing setting information described in the plural types of data formats. According to one aspect of the present invention regarding the printing setting apparatus, the printing setting apparatus includes: an operation acceptor for accepting a user's operation for input; a generator for making printing setting based on control information received by the operation acceptor and generating printing setting information described in the one data format based on the printing setting; a converter for converting the printing setting information which is generated by the generator and described in the one data format into printing setting information described in another data format included in the plural types of data formats; and an output part for outputting the printing setting information which is generated by the converter and described in the another data format.

According to another aspect of the present invention regarding the printing setting apparatus, the printing setting apparatus includes: an input part for receiving printing setting information described in another data format which is included in the plural types of data formats and is different from the one data format; a converter for converting the printing setting information described in the another data format received by the input part, into the printing setting information described in the one data format; and a job submitter for adding the printing setting information which is generated by the converter and described in the one data format to a printing job, and submitting the printing job to the image forming apparatus.

Also, the present invention is secondly directed to a non-transitory computer readable recording medium on which a program is recorded, the program being executed in a printing setting apparatus for generating printing setting information described in one data format included in plural types of data formats and submitting a printing job to an image forming apparatus capable of executing a printing job based on printing setting information described in the plural types of data formats. According to one aspect of the present invention regarding the recording medium, the program causes the printing setting apparatus to function as a system including: a generator for making printing setting based on control information input by a user and generating printing setting information described in the one data format based on the printing setting; a converter for converting the printing setting information which is generated by the generator and described in the one data format into printing setting information in another data format which is included in the plural types of data formats; and an output part for outputting the printing setting information which is generated by the generator and described in the another data format.

According to another aspect of the present invention regarding the recording medium, the program causes the printing setting apparatus to function as a system including: an input part for receiving printing setting information described in another data format which is included in the plural types of data formats and is different from the one data format; a converter for converting the printing setting information which is received by the input part and described in the another data format into the printing setting information described in the one data format; and a printing job submitter for adding the printing setting information which is generated by the converter and described in the one data format to a printing job, and submitting the printing job to the image forming apparatus.

Also, the present invention is thirdly directed to an image forming system including: an image forming apparatus capable of executing a printing job based on printing setting information described in plural types of data formats: a first printing setting apparatus for generating printing setting information described in a first data format included in the plural types of data formats, and submitting a printing job to the image forming apparatus; and a second printing setting apparatus for generating printing setting information described in a second data format included in the plural types of data formats, and submitting a printing job to the image forming apparatus. According to one aspect of the present invention regarding the image forming system, the first printing setting apparatus includes: a generator for making printing setting based on control information input by a user, and generating the printing setting information described in the first data format based on the printing setting; a converter for converting the printing setting information which is generated by the generator and described in the first data format, into the printing setting information described in the second data format; and an output part for outputting the printing setting information which is generated by the converter and described in the second data format, to the second printing setting apparatus, and the second printing setting apparatus includes: an input part for receiving the printing setting information which is output from the first printing setting apparatus and described in the second data format; and a job submitter for adding the printing setting information which is received by the input part and described in the second data format, to a printing job, and submitting the printing job to the image forming apparatus.

According to another aspect of the present invention regarding the image forming system, the first printing setting apparatus includes: a generator for making printing setting based on control information input by a user and generating the printing setting information described in the first data format based on the printing setting; and an output part for outputting the printing setting information which is generated by the generator and described in the first data format, to the second printing setting apparatus, and the second printing setting apparatus includes: an input part for receiving the printing setting information which is output from the first printing setting apparatus and described in the first data format; a converter for converting the printing setting information which is received by the input part and described in the first data format, into the printing setting information described in the second data format; and a job submitter for adding the printing setting information which is generated by the converter and described in the second data format, to a printing job, and submitting the printing job to the image forming apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3A illustrates one example of a printing setting page in a case where an operation panel is used as a user interface;

FIG. 3B illustrates one example of printing setting information which is generated in accordance with a user's operation in the case of FIG. 3A;

FIG. 6A illustrates one example of a printing setting page in a case where a mobile data terminal in which an e-mail program is being opened is used as a user interface;

FIG. 6B illustrates one example of printing setting information which is input and generated in accordance with a user's operation in the case of FIG. 6B;

DESCRIPTION OF THE PREFERRED EMBODIMENTS

Figure 1:
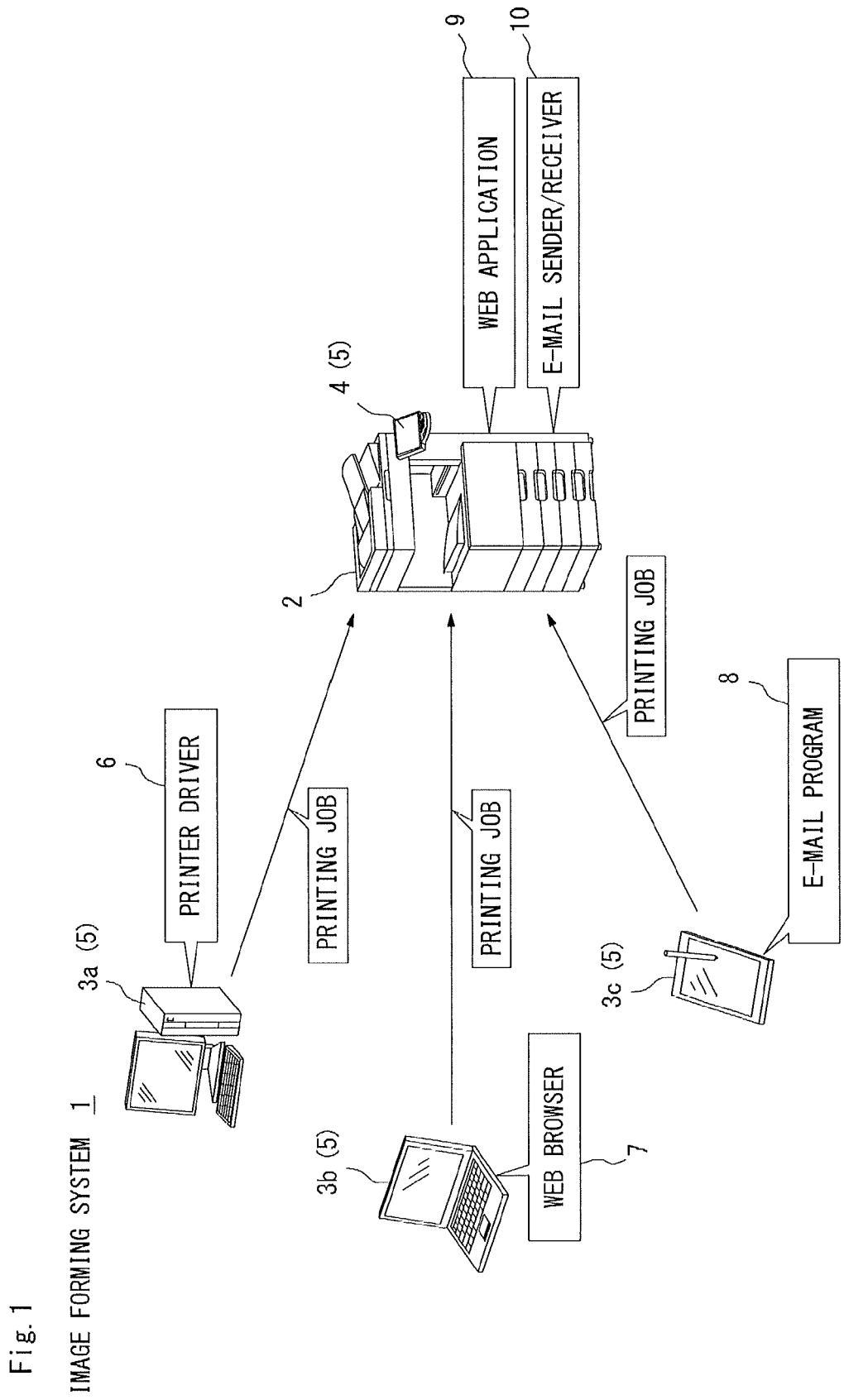
FIG. 1 illustrates one example of a structure of an image forming system.

Below, a preferred embodiment of the present invention will be described in detail with reference to accompanying drawings. In the preferred embodiment described below, the same parts will be denoted with the same reference numerals, and duplicate description of those parts will be avoided.

FIG. 1 illustrates one example of a structure of an image forming system 1 according to a preferred embodiment of the present invention. The image forming system 1 includes an image forming apparatus 2, a computers 3a and 3b, and a mobile data terminal 3c including a tablet device, a smart phone, or the like. The image forming system 1 is designed such that the foregoing components 2, 3a, 3b, and 3c can transmit/receive data with each other via a network such as a local area network (LAN).

The image forming apparatus 2 is informed from one of a network printer, a multifunction peripheral (MHP), and the like. The image forming apparatus 2 executes a printing job submitted in accordance with a user's instruction, to thereby form an image on a printing medium such as a printing paper and produce printouts. The image forming apparatus 2 includes an operation panel 4 for displaying various pages for setting of various printing conditions and accepting a user's operation, on a front side of a body thereof, for example. A user can make setting of various printing conditions and submit a printing job to the image forming apparatus 2 by performing an operation on the operation panel 4. Thus, the operation panel 4 serves as one of user interfaces 5 for submission of a printing job to the image forming apparatus 2.

Also, the image forming apparatus 2 can receive printing jobs in various modes which are transmitted from the computer 3a or 3b, or the mobile data terminal 3c, via a network, and can execute those printing jobs as received.

For example, a printer driver 6 corresponding to the image forming apparatus 2 is installed in the computer 3a. The computer 3a activates the printer driver 6, to display pages for setting of various printing conditions and submit a printing job to the image forming apparatus 2 in accordance with a user's operation. In other words, a user of the computer 3a can make setting of various printing conditions and further can submit a printing job to the image forming apparatus 2, by activating the printer driver 6 in the computer 3a and performing an operation on a page displayed by the printer driver 6. Thus, a page displayed on the computer 3a by the printer driver is one of the user interfaces 5 for submission of a printing job to the image forming apparatus 2.

Further, while the printer driver 6 corresponding to the image forming apparatus 2 is not installed in the computer 3b, a typical web browser 7 is installed in the computer 3b. On the other hand, a web application 9 serving as a web server is imported in the image forming apparatus 2. Upon receipt of an access request via a network, the web application outputs a page for printing setting for submission of a printing job to the image forming apparatus 2, in the form of a web page. Thus, the computer 3b starts up the web browser 7 and accesses URL of the web application 9, to thereby display pages for setting of various printing conditions and submit a printing job to the image forming apparatus 2 in accordance with a user's operation. Accordingly, a page which is provided by the web application 9 of the image forming apparatus 2 and is displayed on the web browser 7 of the computer 3b is one of the user interfaces 5 for submission of a printing job to the image forming apparatus 2.

Moreover, while the printer driver 6 conforming to the image forming apparatus 2 is not installed in the mobile data terminal 3c, and a typical e-mail program 8 is installed in the mobile data terminal 3c. On the other hand, the image forming apparatus 2 includes an e-mail sender/receiver 10 which has an e-mail printing function. More specifically, when an e-mail is received via e network, the e-mail sender/receiver 10 functions to produce printouts using an attached file of the received e-mail as data for printing. Thus, a user of the mobile data terminal 3c can submit a printing job to the image forming apparatus 2 by starting up the e-mail program 8 and sending an e-mail destined to an e-mail address of the image forming apparatus 2. Accordingly, a page displayed on the mobile data terminal 3c by the e-mail program 8 is one of the user interfaces 5 for submission of a printing job to the image forming apparatus 2.

As described above, in submitting a printing job to the image forming apparatus 2, each of a page locally displayed on the operation panel 4 and pages remotely displayed by the printer driver 6, the web application 9, and the e-mail program 8 can be used as the user interface 5. Therefore, by selecting an arbitrary one from the above-cited four user interfaces 5 and performing an operation, a user can submit a printing job to the image forming apparatus 2. This provides enhanced convenience of the customers particularly in a case where data for printing is stored in the computer 3b or the mobile data terminal 3c held by a user, because the user can submit a printing job by starting up the typical web browser 7 or the e-mail program 8 which has been already installed in the computer 3b or the mobile data terminal 3c and performing an operation, without the labor of installing the printer driver 6 designed for exclusive use, in the computer 3b or the mobile data terminal 3c.

It is additionally noted that the image forming apparatus 2 may execute a copying job, a scanning job, and the like other than a printing job described above. The following description will be made by taking a case where the image forming apparatus 2 is designed as a MFP and can execute a copying job and the like other than a printing job, as one example.

Figure 2:
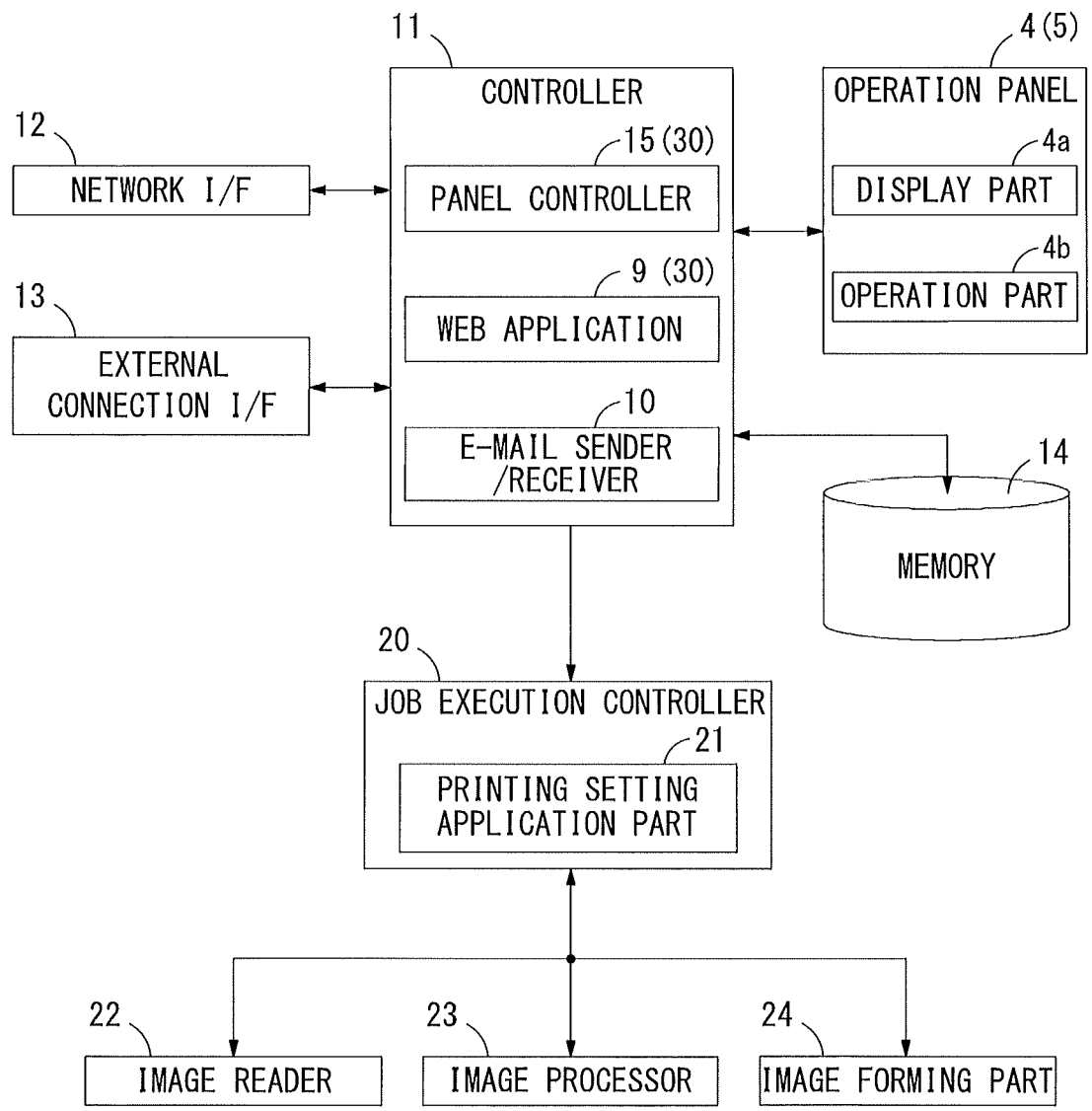
FIG. 2 is a block diagram illustrating one example of a hardware configuration of the image forming system.

FIG. 2 is a block diagram illustrating one example of a hardware configuration of the image forming apparatus 2. As illustrated in FIG. 2, the image forming apparatus 2 includes a hardware configuration in addition to the operation panel 4 which has already been described above. The hardware configuration includes a controller 11, a network interface 12, an external connection interface 13, a memory 14, a job execution controller 20, an image reader 22, an image processor 23, and an image forming part 24.

The operation panel 4 includes a display part 4a for displaying pages for setting of various printing conditions and an operation part 4b on which a user performs an operation. The display part 4a includes a color liquid crystal display, for example. Also, the operation part 4b includes touch panel keys provided on a screen of the display part 4a, push-button keys placed in the perimeter of the screen of the display part 4a, and the like.

The controller 11 includes a CPU and a memory which are not illustrated in the figures, for example. As a result of execution of a predetermined program in the CPU, the controller 11 functions as a panel controller 15, the web application 9, and the e-mail sender/receiver 10. Then, the controller 11 outputs a printing job designated by the user interface 5 described above, to the job execution controller 20, to thereby achieve submission of a printing job to the image forming apparatus 2.

The panel controller 15 for controlling the operation panel 4 updates pages for setting of various printing conditions displayed on the display part 4a, in accordance with a user's operation. Further, the panel controller 15 functions as a printing setting apparatus 30 which generates information about printing setting in accordance with a user's operation performed on the operation panel 4 and submits a printing job additionally including the generated information about printing setting to the job execution controller 20.

The web application 9 outputs pages for setting of various conditions in the form of web pages on a network as described above. Upon receipt of control information regarding any of the web pages, the web application 9 updates a concerned page for printing setting based on the received control information. Further, as with the panel controller 15, the web application 9 functions as the printing setting apparatus 30 which generates information about printing setting based on control information received via a network and submits a printing job additionally including the generated information about printing setting to the job execution controller 20. The web application 9 can also generate a printing job by reading out data for printing which is designated by a user, from the memory 14, for example, add information about printing setting to the generated printing job, and submit the resultant printing job to the job execution controller 20.

The e-mail sender/receiver 10 is a processing part for sending/receiving an e-mail message via a network. The e-mail sender/receiver 10 automatically receives any e-mail messages that are accumulated in a predetermined mail server and destined to an e-mail address of the image forming apparatus 2. If a received e-mail includes an attached file, the c-mail sender/receiver 10 determines that the received e-mail is a printing job utilizing an e-mail printing function, and outputs the received e-mail to the job execution controller 20. At that time, the e-mail sender/receiver 10 may also save the received e-mail in the memory 14.

The controller 11, upon receipt of a printing job transmitted by the printer driver 6 of the computer 3a, outputs the received printing job to the job execution controller 20.

The network interface 12 which connects the controller 11 to a network is responsible for transmission/reception of printing jobs, e-mail messages, and other various types of data via a network. The external connection interface 13 connects the controller 11 with an external device such as USB memory.

The memory 14 is a non-volatile storage device such as a hard disk drive (HDD) or a solid state drive (SSD). In the memory 14, printing jobs and e-mail messages which are received by the image forming apparatus 2 via a network, or information about printing setting which is made by a user with the use of each of the user interfaces 5, can be saved.

The job execution controller 20 controls execution of a job requested by the controller 11. The job execution controller 20 controls the image reader 22 for reading out an original image and generating image data, the image processor 23 for performing a variety of image processing such as scaling-up/down of image data and color conversion, and the image forming part 24 for forming an image on a printing medium such as a printing paper based on received image data and producing printouts.

The job execution controller 20 includes a printing setting application part 21. The printing setting application part 21 performs its functions when an instruction for execution of a printing job is given by the controller 11. Specifically, the printing setting application part 21 makes necessary printing setting for each of the image processor 23 and the image forming part 24 based on information about printing setting which is added to the printing job. Then, after necessary setting is applied in each of the image processor 23 and the image forming part 24 by the printing setting application part 21, the job execution controller 20 causes each of the image processor 23 and the image forming part 24 to operate, to thereby execute a printing job in an output mode designated by a user.

Next, description will be made with respect to displayed pages in a case where a user performs an operation for printing setting using each of the above-cited four user interfaces 5, and a data format of information about printing setting ("printing setting information") which is generated by an operation performed on each of the user interfaces 5.

First, FIG. 3A illustrates an example of a printing setting page G1 in a case where the operation panel 4 is used as the user interface 5, and FIG. 3B illustrates one example of printing setting information D1 generated in accordance with a user's operation. In a case where a printing job (including a copying job) is submitted by a user's operation on the operation panel 4 of the image forming apparatus 2, the display part 4a of the operation panel 4 displays the printing setting page G1 illustrated in FIG. 3A. Thus, a user can make printing setting which leads to a desired output mode by performing an operation on the displayed printing setting page G1. The printing setting page G1 in FIG. 3A shows a state in which the number of copies is set to four, color setting is adjusted to full colors, a page size is set to A4, an output mode is set to duplex printing, and integration setting is adjusted to "2 in 1", as one example. Also, by operating a finishing button in the printing setting page G1, a user can further perform an operation with respect to finishing with a finishing setting page for setting about stapling or the like at the time of printout, being displayed.

In a case where a user performs an operation for printing setting illustrated in FIG. 3A, the printing setting information D1 generated based thereon is as illustrated in FIG. 3B, for example. Specifically, when a user submits a printing job by performing an operation on the operation panel 4 of the image forming apparatus 2, the printing setting information D1 described in a particular data format illustrated in FIG. 3B is generated within the image forming apparatus 2. It is additionally noted that though the example in FIG. 3B employs a data format in a list form in which set values specified by a user are described in text for respective items of printing setting, an employable data format is not necessarily limited to that. The printing setting information D1 is output to the job execution controller 20 from the panel controller 15 when a user gives an instruction for execution of a printing job by operating a start key in the operation panel 4, for example.

Further, the printing setting page G1 in FIG. 3A includes a setting saving button 27a for outputting printing setting information generated in accordance with a user's operation for printing setting, and a setting reading button 27b for reading out printing setting information which has already been saved, and causing the read information to be reflected in a page. Thus, as a result of a user's operation on those buttons 27a and 27b, printing setting information based on the printing setting page G1 can be output or saved. Alternatively, another printing setting information can be read out and reflected in the printing setting page G1. With respect to this matter, detailed description will be later provided.

Figures 4A, 4B:
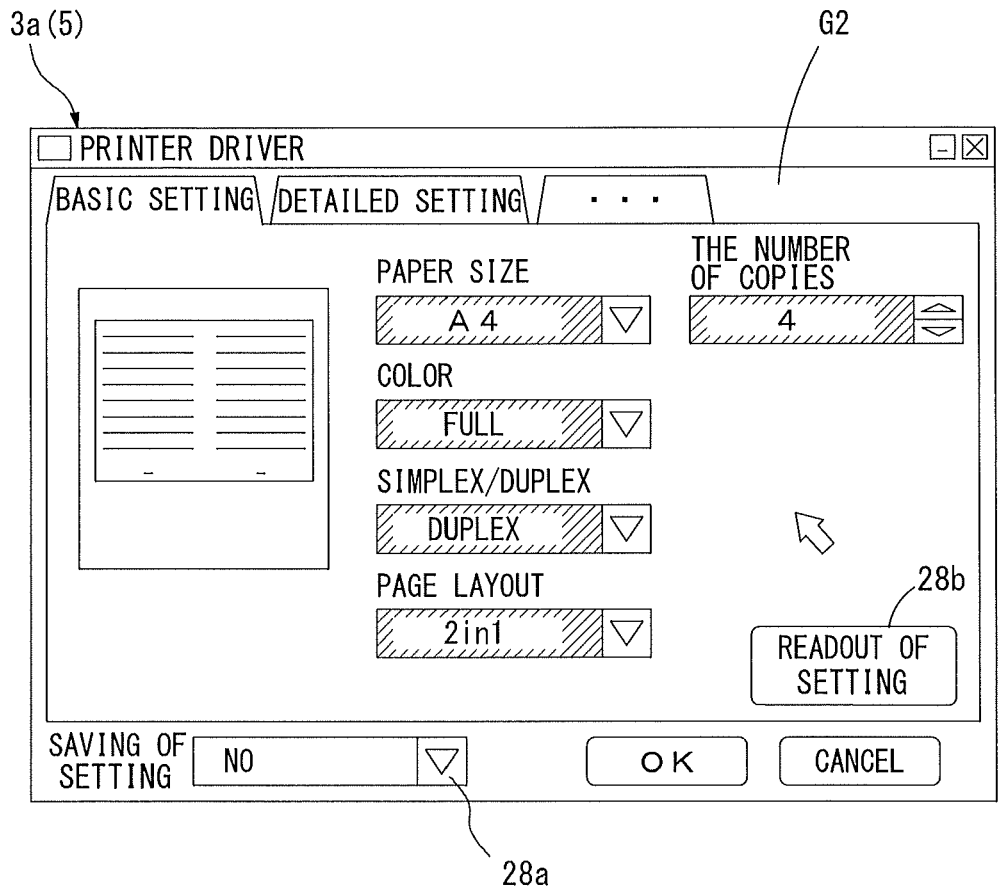
FIG. 4A illustrates one example of a printing setting page in a case where a user interface provided by a printer driver is used.
FIG. 4B illustrates one example of printing setting information which is generated in accordance with a user's operation in the case of FIG. 4A.

FIG. 4A illustrates one example of a printing setting page G2 in a case where the computer 3a in which the printer driver 6 is being activated is used as the user interface 5, and FIG. 4B illustrates one example of printing setting information D2 generated by the printer driver 6 in accordance with a user's operation. In a case where a printing job is submitted as a result of the printer driver 6 in the computer 3a being activated by a user, the computer 3a displays the printing setting page G2 illustrated in FIG. 4A. The printing setting page G2 is a page displayed by the printer driver 6 activated in the computer 3a. A user who uses the computer 3a can make printing setting which leads to a desired output mode by performing an operation on the displayed printing setting page G2, for example. The printing setting page G2 in FIG. 4A shows a state in which the same printing setting as in FIG. 3A is made, as one example. Also, by operating a detail setting tab in the printing setting page G2, a user can further perform an operation with respect to finishing with a finishing setting page for setting about stapling or the like at the time of printout, being displayed.

In a case where a user performs an operation for printing setting illustrated in FIG. 4A, the printing setting information D2 generated based thereon by the printer driver 6 is as illustrated in FIG. 4B, for example. Specifically, when a user submits a printing job via a network by activating the printer driver 6, the printing setting information D2 described in a data format in accordance with the definition of printer job language (PJL) as illustrated in FIG. 4B is generated through processing of the printer driver 6, for example. The printing setting information D2 is added to a printing job when the printer driver 6 transmits the printing job to the image forming apparatus 2. Therefore, the printer driver 6 activated in the computer 3a functions as the printing setting apparatus 30, as with the above-described panel controller 15, because the printer driver 6 generates the printing setting information D2 in accordance with a user's operation and submits a printing job additionally including the generated printing setting information D2 to the image forming apparatus 2.

Further, the printing setting page G2 in FIG. 4A includes a pull-down menu button 28a for outputting printing setting information generated in accordance with a user's operation for printing setting and a setting reading button 28b for reading out printing setting information which has already been saved and causing the read information to be reflected in a page. Thus, as a result of a user's operation on those buttons 28a and 28b, printing setting information based on the printing setting page G2 can be output or saved. Alternatively, another printing setting information can be read out and reflected in the printing setting page G2. With respect to this matter, detailed description will be later provided.

Figures 5A, 5B:
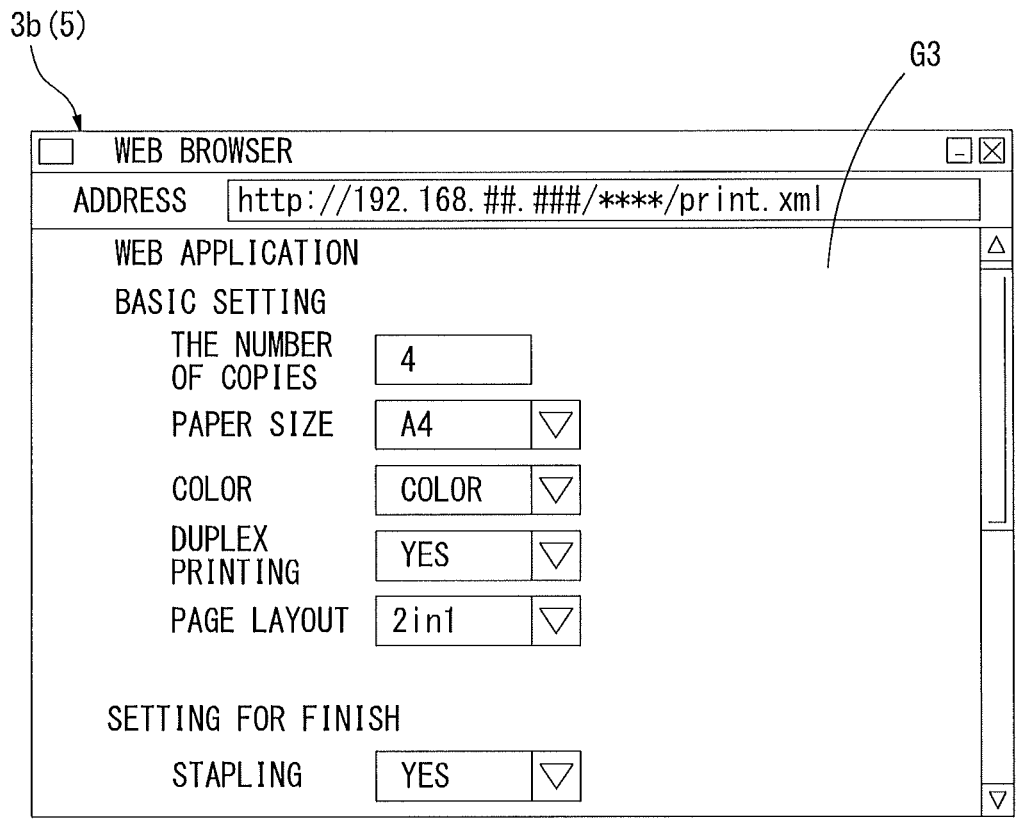
FIG. 5A illustrates one example of a printing setting page in a case where a computer in which a web browser is being opened is used as a user interface.
FIG. 5B illustrates one example of printing setting information which is generated in accordance with a user's operation in the case of FIG. 5A.

FIG. 5A illustrates one example of a printing setting page G3 in a case where the computer 3b in which the web browser 7 is being opened is used as the user interface 5, and FIG. 5B illustrates one example of printing setting information D3 generated by the web application 9 in accordance with a user's operation. When a user opens the web browser 7 in the computer 3b and accesses URL of the web application 9, the computer 3b displays the printing setting page G3 illustrated in FIG. 5A. The printing setting page G3 is a page provided and displayed by the web application 9 of the image forming apparatus 2. A user who uses the computer 3b can designate data for printing and also can make printing setting which leads to a desired output mode by performing an operation on the displayed printing setting page G3. The printing setting page G3 in FIG. 5A shows a state in which the same printing setting as in FIGS. 3A and 4A is made, as one example.

In a case where a user performs an operation for printing setting illustrated in FIG. 5A, the printing setting information D3 generated based thereon by the web application 9 is as illustrated in FIG. 5B, for example. Specifically, when a user submits a printing job via a network by using the web application 9 of the image forming apparatus 2, the printing setting information D3 described in a data format in accordance with the definition of common gateway interface (CGI) of hypertext transfer protocol (HTTP) as illustrated in FIG. 5B is generated through processing of the web application 9, for example. When the web application 9 receives a printing job from the computer 3b, the printing setting information D3 is output to the job execution controller 20 while being added to the received printing job.

Moreover, with scroll-down of a displayed area of the printing setting page G3, a button for outputting printing setting information generated in accordance with a user's operation for printing setting and a button for reading out printing setting information which has already been saved and causing the read information to be reflected in a page, would appear in the same manner as in the above-described printing setting pages G1 and G2, though illustration thereof is omitted in the printing setting page G3 in FIG. 5A. Thus, as a result of a user's operation on those buttons, printing setting information based on the printing setting page G3 can be output or saved. Alternatively, another printing setting information can be read out and reflected in the printing setting page G3.

FIG. 6A illustrates one example of a printing setting page G4 in a case where the mobile data terminal 3c in which the typical e-mail program 8 is being opened is used as the user interface 5, and FIG. 6B illustrates one example of printing setting information D4 input and generated in accordance with a user's operation. When a user opens the e-mail program 8 in the mobile data terminal 3c, the mobile data terminal 3c displays the printing setting page G4 illustrated in FIG. 6A. The printing setting page G4 is a page displayed by the e-mail program 8, where e-mail which is to be sent is edited. A user who uses the mobile data terminal 3c can compose an e-mail message for submitting a printing job to the image forming apparatus 2 by performing an operation on the displayed printing setting page G4. Specifically, a user first types an e-mail address of the image forming apparatus 2 in an address space, and puts data for printing into an attached file. Then, the user manually types a text command in a subject space as illustrated in FIG. 6A, to thereby make printing setting which leads to a desired output mode. In the example of the printing setting page G4 in FIG. 6A, a text command in a state in which the same printing setting as in FIGS. 3A, 4A, and 5A is made is shown as one example.

In a case where a user performs an operation for printing setting illustrated in FIG. 6A, the printing setting information D4 generated based thereon is the same as the text command manually typed in the subject space, as illustrated in FIG. 6B. Thus, when a user submits a printing job via an e-mail using an e-mail printing function of the image forming apparatus 2, it is necessary to correctly input the printing setting information D4 described in a data format in text as illustrated in FIG. 6B. In other words, in producing printouts with the use of the e-mail printing function, the image forming apparatus 2 employs printing setting based on the printing setting information D4 provided in the subject space of a received e-mail, to submit a printing job. Thus, if a character or a string which does not correspond to a predetermined command is included in the subject space, it is impossible to grasp printing setting designated by a user. Therefore, when a user composes an e-mail in order to use an e-mail printing function of the image forming apparatus 2, it is necessary to correctly type a text command which can be interpreted in the image forming apparatus 2, in the subject space.

Moreover, also the e-mail program 8 opened in the mobile data terminal 3c functions as the printing setting apparatus 30, as with the above-described panel controller 15 or the like, because the e-mail program 8 generates the printing setting information D4 in accordance with a user's operation and submits a printing job additionally including the generated printing setting information D4 to the image forming apparatus 2.

As is described above, according to the preferred embodiment, in a case where the user interfaces 5 used by users are different from each other, when printing jobs are submitted to the image forming apparatus 2, pieces of printing setting information added to the submitted printing jobs are in different data formats. Thus, the above-described printing setting application part 21 of the job execution controller 20 is designed to be capable of analyzing each of those plural types of data formats and making proper printing setting based on printing setting information added to each of printing jobs.

Now, a functional configuration in a case where the printing setting apparatus 30 performs its functions by virtue of each of the printer driver 6, the web application 9, the panel controller 15, and the e-mail program 8, will be described.

Figure 7:
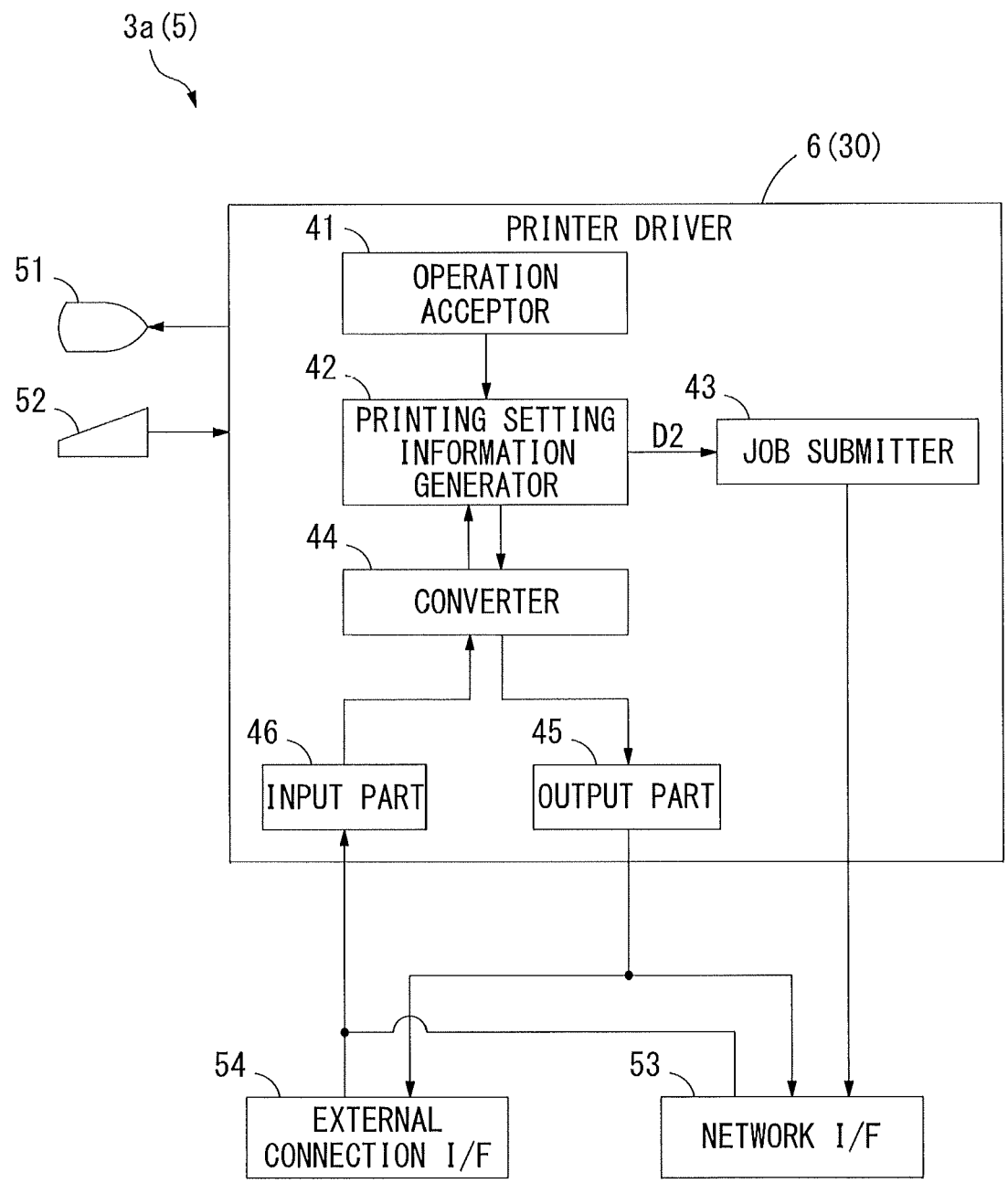
FIG. 7 is one example of a functional block diagram in a case where a computer having a printer driver being activated functions as a printing setting apparatus.

First, FIG. 7 is one example of a functional block diagram in a case where the computer 3a functions as the printing setting apparatus 30 through activation of the printer driver 6 in the computer 3a. As illustrated in FIG. 7, the printing setting apparatus 30 associated with the printer driver 6 includes an operation acceptor 41, a printing setting information generator 42, a job submitter 43, a converter 44, an input part 46, and an output part 45.

The operation acceptor 41 accepts a user's operation for input via an operation part 52 such as keyboards or a mouse while the printer driver 6 is activated and the printing setting page G2 is being displayed on the display part 51 of the computer 3a. Then, the operation acceptor 41 outputs control information in accordance with the user's operation for input, to the printing setting information generator 42.

The printing setting information generator 42 updates the printing setting page G2 based on the control information received from the operation acceptor 41 so that updated printing setting can be reflected in the displayed page, and also generates the printing setting information D2 based on the updated printing setting. The printing setting information D2 which is generated by the printing setting information generator 42 of the printer driver 6 in accordance with a user's operation for printing setting is in a data format described in accordance with the definition of PJL, for example, as described above. Then, in response to a user's instruction for submission of a printing job, the printing setting information generator 42 outputs the printing setting information D2 generated based on printing setting at that point of time, to the job submitter 43.

The job submitter 43 transmits a printing job to the image forming apparatus 2 via the network interface 53 of the computer 3a. The job submitter 43 acquires data for printing from a document editing application, for example, which is being opened in the computer 3a separately from the printer driver 6, to generate a printing job. Then, in transmitting the generated printing job to the image forming apparatus 2, the job submitter 43 adds the printing setting information D2 described in a data format of PJL which is generated by the printing setting information generator 42, to the printing job, and transmits the resultant job.

The converter 44 is a processing part for converting a data format of printing setting information. The converter 44 of the printer driver 6 converts the printing setting information D2 described in a data format of PJL which is generated in the printing setting information generator 42 into the printing setting information D1, D3, or D4, in a different data format. Alternatively, the converter 44 converts the printing setting information D1, D3, or D4 in a different data format into the printing setting information D2 described in a data format of PJL which can be processed in the printing setting information generator 42.

The output part 45 is a processing part for outputting printing setting information based on the printing setting page G2 when a user operates the pull-down menu button 28a in the printing setting page G2. That is, the output part 45 does not submit a printing job to the image forming apparatus 2, but outputs only printing setting information based on the printing setting page G2 to a destination designated by a user. For example, the output part 45 is capable of transmitting printing setting information to another device via the network interface 53, and also is capable of outputting printing setting information to an external device such as USB memory connected to the external connection interface 54 of the computer 3a. Further, the output part 45 is capable of sending an e-mail to which printing setting information is added, in transmitting printing setting information to the mobile data terminal 3c, for example.

Moreover, the output part 45 outputs the printing setting information D2 described in a data format of PJL which is generated in the printing setting information generator 42 in a case a user gives an instruction for output of the printing setting information D2 described in a data format of PJL. In contrast thereto, in a case where a user gives an instruction for output of the printing setting information D1, D3, or D4 described in a data format different from a data format of PJL, the output part 45 acquires the printing setting information D1, D3, or D4 in a different data format which is resulted from conversion of data format in the converter 44 and outputs the resultant printing setting information D1, D3, or D4.

On the other hand, the input part 46 is a processing part for receiving printing setting information which is to be reflected in the printing setting page G2 when a user operates the setting reading button 28b in the printing setting page G2. That is, the input part 46 receives printing setting information which is to be reflected in the printing setting page G2 from a location of storage designated by a user. For example, the input part 46 is capable of acquiring printing setting information stored in a different device via the network interface 53 and is also capable of acquiring printing setting information stored in an external device such as a USB memory connected with the external connection interface 54 of the computer 3a.

Further, in a case where printing setting information acquired in accordance with a user's instruction is the printing setting information D2 described in a data format of PJL, the input part 46 outputs the acquired printing setting information D2 to the printing setting information generator 42 without performing any process thereon. As a result, printing setting based on the printing setting information D2 acquired by the input part 46 is reflected in the printing setting page G2 displayed on the display part 51.

In contrast thereto, in a case where printing setting information acquired in accordance with a user's instruction is the printing setting information D1, D3, or D4 described in a data format different from a data format of PJL, the input part 46 outputs the acquired printing setting information D1, D3, or D4 to the converter 44. The converter 44, which receives the printing setting information D1, D3, or D4 from the input part 46, then converts the printing setting information D1, D3, or D4 into the printing setting information D2 described in a data format of PJL which can be processed in the printing setting information generator 42, to output the printing setting information D2 resulted from conversion, to the printing setting information generator 42. As a result, printing setting corresponding to the printing setting information D1, D3, or D4 acquired by the input part 46 can be reflected in the printing setting page G2 displayed on the display part 51.

As is described above, the printing setting apparatus 30 associated with the printer driver 6 has a basic configuration in which the printing setting information D2 described in a data format of PJL is generated in accordance with a user's operation for printing setting, and a printing job to which the generated printing setting information D2 is added is submitted to the image forming apparatus 2. Moreover, the printing setting apparatus 30 associated with the printer driver 6 has an additional configuration in which the printing setting information D2 generated in accordance with a user's operation for printing setting is converted into the printing setting information D1, D3, or D4 in a different data format and output, and the printing setting information D1, D3, or D4 in a different data format is input and converted into the printing setting information D2 in a data format of PJL so that printing setting corresponding to the printing setting information D1, D3, or D4 in a different data format is reflected in the printing setting page G2.

Figure 8:
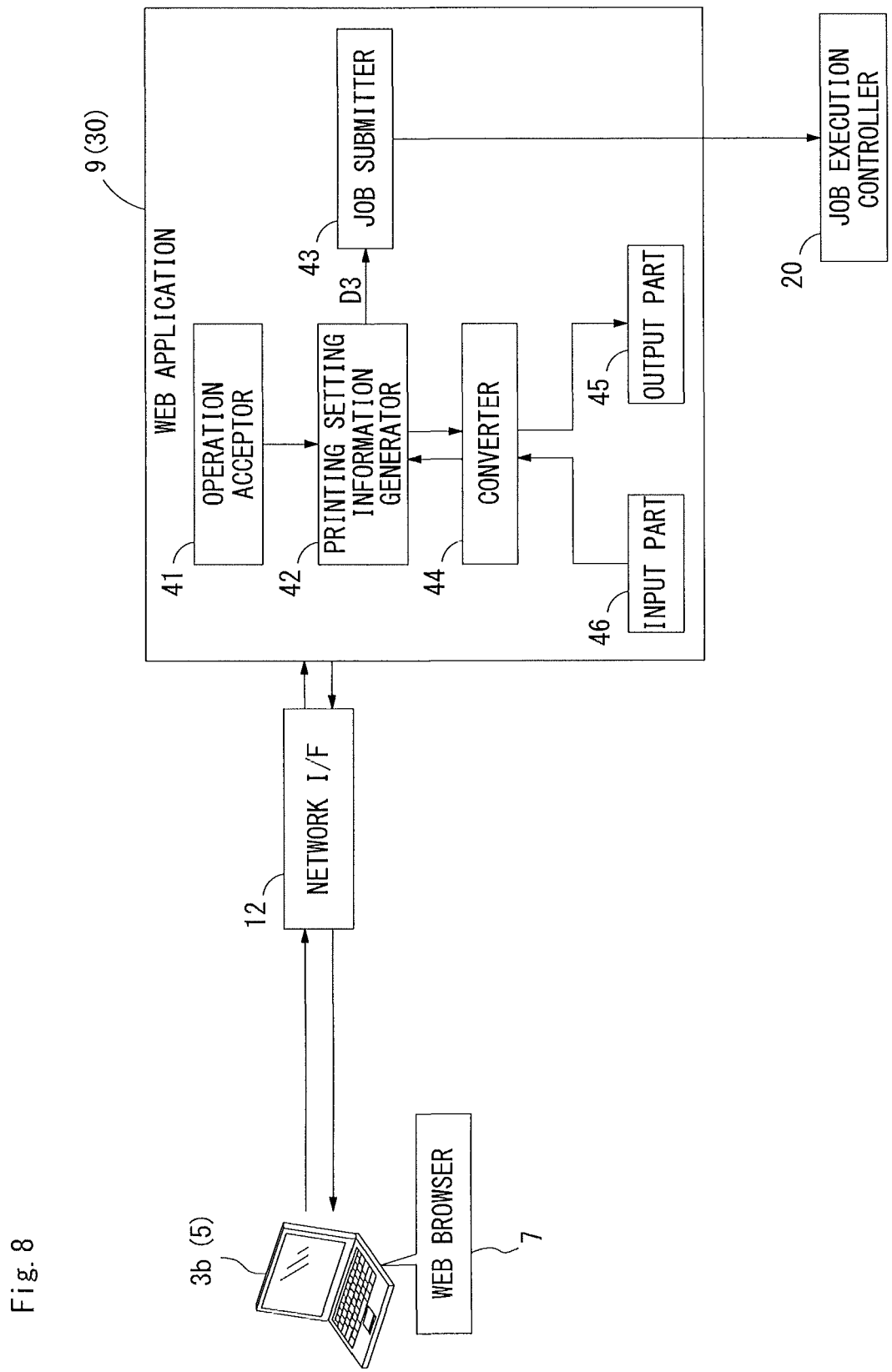
FIG. 8 is one example of a functional block diagram in a case where a web application of an image forming apparatus functions as a printing setting apparatus.

Next, FIG. 8 is one example of a functional block diagram in a case where the web application 9 of the image forming apparatus 2 functions as the printing setting apparatus 30. As illustrated in FIG. 8, also the printing setting apparatus 30 associated with the web application 9 includes the operation acceptor 41, the printing setting information generator 42, the job submitter 43, the converter 44, the input part 46, and the output part 45, in the same way as in FIG. 7. Respective operations of the foregoing components are basically the same as those described above with reference to FIG. 7. Below, more specific operations of the components of the printing setting apparatus 30 associated with the web application 9 will be described.

The operation acceptor 41 accepts an operation for printing setting performed by a user who uses the computer 3b, and outputs control information to the printing setting information generator 42. The printing setting information generator 42 updates the printing setting page G3 in FIG. 5A based on the control information received from the operation acceptor 41 so that printing setting is reflected in the page, and also generates the printing setting information D3 based on the printing setting. The printing setting information D3 generated by the printing setting information generator 42 of the web application 9 in accordance with a user's operation for printing setting is described in a data format in accordance with the definition of CGI of HTTP as described above. Then, in response to a user's instruction for submission of a printing job, the printing setting information generator 42 outputs the printing setting information D3 generated based on printing setting at that point of time, to the job submitter 43.

The job submitter 43 outputs a printing job to the job execution controller 20 of the image forming apparatus 2. The job submitter 43 acquires data for printing designated in the printing setting page G3 from the computer 3b, for example, to generate a printing job. Then, in outputting the generated printing job to the job execution controller 20, the job submitter 43 adds the printing setting information D3 described in a data format of CGI of HTTP which is generated by the printing setting information generator 42, to the printing job. Thus, the printing job is submitted to the image forming apparatus 2.

The converter 44 of the web application 9 converts the printing setting information D3 described in a data format of CGI of HTTP which is generated in the printing setting information generator 42 into the printing setting information D1, D2, or D4 in a different format. Alternatively, the converter 44 converts the printing setting information D1, D2, or D4 in a different data format into the printing setting information D3 in a data format of CGI of HTTP which can be processed in the printing setting information generator 42.

The output part 45 is a processing part for outputting printing setting information based on the printing setting page G3 when a user performs an operation for requesting output of printing setting information. That is, the output part 45 outputs only printing setting information based on the printing setting page G3 to a destination designated by a user. For example, the output part 45 is capable of transmitting printing setting information to the computer 3b via the network interface 12, and also is capable of outputting printing setting information to the memory 14 of the image forming apparatus 2, to save it therein. Further, in transmitting printing setting information to the mobile data terminal 3c, for example, the output part 45 of the web application 9 is capable of activating the e-mail sender/receiver 10 and achieving transmission of the printing setting information with the printing setting information being added to an e-mail which is sent to the mobile data terminal 3c by the e-mail sender/receiver 10.

Moreover, the output part 45 outputs the printing setting information D3 described in a data format of CGI of HTTP which is generated in the printing setting information generator 42 without any process thereon, in a case a user gives an instruction for output of the printing setting information D3 described in a data format of CGI of HTTP. In contrast thereto, in a case where a user gives an instruction for output of the printing setting information D1, D2, or D4 described in a data format different from a data format of CGI of HTTP, the output part 45 acquires the printing setting information D1, D2, or D4 in a different format which is resulted from conversion of data format in the converter 44 and outputs the resultant printing setting information D1, D3, or D4.

On the other hand, the input part 46 is a processing part for receiving printing setting information which is to be reflected in the printing setting page G3 when a user performs an operation for requesting read-out of printing setting information. For example, the input part 46 is capable of acquiring printing setting information stored in the computer 3b via the network interface 12, and also is capable of acquiring printing setting information stored in the memory 14 of the image forming apparatus 2.

Further, in a case where printing setting information acquired in accordance with a user's instruction is the printing setting information D3 described in a data format of CGI of HTTP, the input part 46 outputs the acquired printing setting information D3 to the printing setting information generator 42 without performing any process thereon. As a result, printing setting based on the printing setting information D3 acquired by the input part 46 is reflected in the printing setting page G3 of a web page displayed on the computer 3b.

In contrast thereto, in a case where printing setting information acquired in accordance with a user's instruction is the printing setting information D1, D2, or D4 described in a data format different from a data format of CGI of HTTP, the input part 46 outputs the acquired printing setting information D1, D2, or D4 to the converter 44. The converter 44, which receives the printing setting information D1, D2, or D4 from the input part 46, then converts the printing setting information D1, D2, or D4 into the printing setting information D3 described in a data format of COI of HTTP which can be processed in the printing setting information generator 42, to output the printing setting information D3 which is resulted from conversion, to the printing setting information generator 42. As a result, printing setting corresponding to the printing setting information D1, D2, or D4 acquired by the input part 46 can be reflected in the printing setting page G3 of a web page displayed on the computer 3b.

As is described above, the printing setting apparatus 30 associated with the web application 9 has a basic configuration in which the printing setting information D3 described in a data format of CGI of HTTP is generated in accordance with a user's operation for printing setting, and a printing job to which the generated printing setting information D3 is added is submitted to the image forming apparatus 2. Moreover, the printing setting apparatus 30 associated with the web application 9 has an additional configuration in which the printing setting information D3 generated in accordance with a user's operation for printing setting is converted into the printing setting information D1, D2, or D4 in a different data format and output, and the printing setting information D1, D2, or D4 in a different data format is input and converted into the printing setting information D3 described in a data form a of CGI of HTTP so that printing setting corresponding to the printing setting information D1, D2, or D4 in a different format is reflected in the printing setting page G3.

Figure 9:
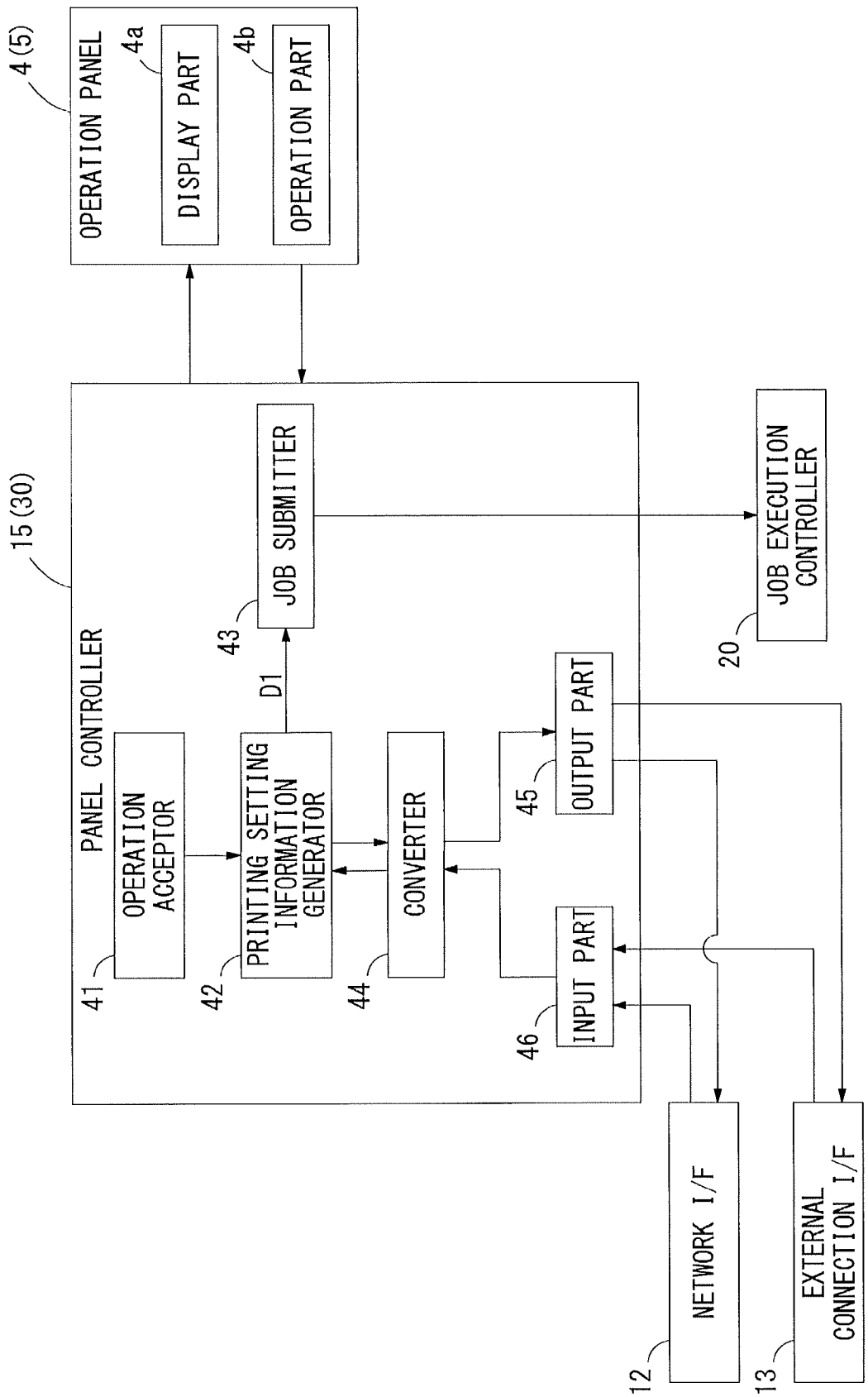
FIG. 9 is one example of a functional block diagram in a case where a panel controller of an image forming apparatus functions as a printing setting apparatus.

Next, FIG. 9 is one example of a functional block diagram in a case where the panel controller 15 of the image forming apparatus 2 functions as the printing setting apparatus 30. As illustrated in FIG. 9, also the printing setting apparatus 30 associated with the panel controller 15 includes the operation acceptor 41, the printing setting information generator 42, the job submitter 43, the converter 44, the input part 46, and the output part 45, in the same way as in FIGS. 7 and 8. Respective operations of the foregoing components are basically the same as those described above with reference to FIGS. 7 and 8. Below, more specific operations of the components of the printing setting apparatus 30 associated with the panel controller 15 will be described.

The operation acceptor 41 accepts a user's operation for printing setting performed on the operation panel 4, and outputs control information to the printing setting information generator 42. The printing setting information generator 42 updates the printing setting page G1 in FIG. 3A based on the control information received from the operation acceptor 41 so that printing setting is reflected in the page, and also generates the printing setting information D1 based on the printing setting. The printing setting information D1 generated by the printing setting information generator 42 of the panel controller 15 in accordance with a user's operation for printing setting is in a particular data format which can be processed in the image forming apparatus 2 as described above. Then, in response to a user's instruction for submission of a printing job, the printing setting information generator 42 outputs the printing setting information D1 generated based on printing setting at that point of time, to the job submitter 43.

The job submitter 43 gives an instruction for execution of a printing job to the job execution controller 20 of the image forming apparatus 2, to thereby submit a printing job to the image forming apparatus 2. The job submitter 43, in submitting a printing job to the job execution controller 20, outputs the printing setting information D1 described in a particular data format which is generated by the printing setting information generator 42, to the job execution controller 20, to thereby give an instruction for execution of a job. The job submitter 43 is also capable of generating a printing job by reading out data for printing designated by a user from the memory 14 and submitting the generated printing job while adding the printing setting information D1 to the job.

The converter 44 of the panel controller 15 converts the printing setting information D1 described in a particular data format which is generated in the printing setting information generator 42 into the printing setting information D2, D3, or D4 in a different format. Alternatively, the converter 44 converts the printing setting information D2, D3, or D4 in a different data format into the printing setting information D1 in a particular data format which can be processed in the printing setting information generator 42.

The output part 45 is a processing part for outputting printing setting information based on the printing setting page G1 when a user operates the setting saving button 27a in the printing setting page G1. The output part 45 outputs only printing setting information based on the printing setting page G1 to a destination designated by a user. For example, the output part 45 is capable of transmitting printing setting information to another device via the network interface 12, and also is capable of outputting the printing setting information D1 to an external device such as a USB memory connected to the external connection interface 13. Further, the output part 45 is capable of outputting printing setting information to the memory 14 of the image forming apparatus 2, to save it therein. Moreover, in transmitting printing setting information to the mobile data terminal 3c, for example, the output part 45 of the panel controller 15 is capable of activating the e-mail sender/receiver 10 and achieving transmission of the printing setting information with the printing setting information being added to an e-mail which is sent to the mobile data terminal 3c by the e-mail sender/receiver 10.

Furthermore, the output part 45 outputs the printing setting information D1 described in a particular data format which is generated in the printing setting information generator 42 without any process thereon, in a case a user gives an instruction for output of the printing setting information D1 described in a particular data format. In contrast thereto, in a case where a user gives an instruction for output of the printing setting information D2, D3, or D4 described in a data format different from a particular data format, the output part 45 acquires the printing setting information D2, D3, or D4 in a different data format in a different data format which is resulted from conversion of data format in the converter 44 and outputs the resultant printing setting information D2, D3, or D4.

On the other hand, the input part 46 is a processing part for receiving printing setting information which is to be reflected in the printing setting page G1 upon a user's operation on the setting reading button 27b. For example, the input part 46 is capable of acquiring printing setting information stored in another device via the network interface 12, and also is capable of acquiring printing setting information from an external device connected with the external connection interface 13. Further, the input part 46 is capable of acquiring printing setting information stored in the memory 14 of the image forming apparatus 2.

Moreover, in a case where printing setting information acquired in accordance with a user's instruction is the printing setting information D1 described in a particular data format, the input part 46 outputs the acquired printing setting information D1 to the printing setting information generator 42 without performing any process thereon. As a result, printing setting based on the printing setting information D1 acquired by the input part 46 is reflected in the printing setting page G1 displayed on the display part 4a of the operation panel 4.

In contrast thereto, in a case where printing setting information acquired in accordance with a user's instruction is the printing setting information D2, D3, or D4 described in a data format different from a particular data format, the input part 46 outputs the acquired printing setting information D2, D3, or D4 to the converter 44. The converter 44, which receives the printing setting information D2, D3, or D4 from the input part 46, then converts the printing setting information D2, D3, or D4 into the printing setting information D1 described in a particular data format which can be processed in the printing setting information generator 42, to output the printing setting information D1 which is resulted from conversion, to the printing setting information generator 42. As a result, printing setting corresponding to the printing setting information D2, D3, or D4 acquired by the input part 46 can be reflected in the printing setting page G1 displayed on the display part 4a of the operation panel 4.

As is described above, the printing setting apparatus 30 associated with the panel controller 15 has a basic configuration in which the printing setting information D1 described in a particular data format is generated in accordance with a user's operation for printing setting and a printing job to which the generated printing setting information D1 is added is submitted to the image forming apparatus 2. Moreover, the printing setting apparatus 30 associated with the panel controller 15 has an additional configuration in which the printing setting information D1 generated in accordance with a user's operation for printing setting is converted into the printing setting information D2, D3, or D4 in a different data format and output, and the printing setting information D2, D3, or D4 in a different data format is input and converted into the printing setting information D1 in a particular data format so that printing setting corresponding to the printing setting information D2, D3, or D4 in a different format is reflected in the printing setting page G1.

It is noted that the above description has dealt with a case where the converter 44 of each of the printing setting apparatuses 30 is capable of making conversion from printing setting information in one data format into information in each of all other data formats, and is also capable of making its inverse conversion, as one example. However, when each of the printing setting apparatuses 30 exchanges printing setting information with another printing setting apparatus, exchange of information may be achieved by using a predetermined common data format.

Figure 10:
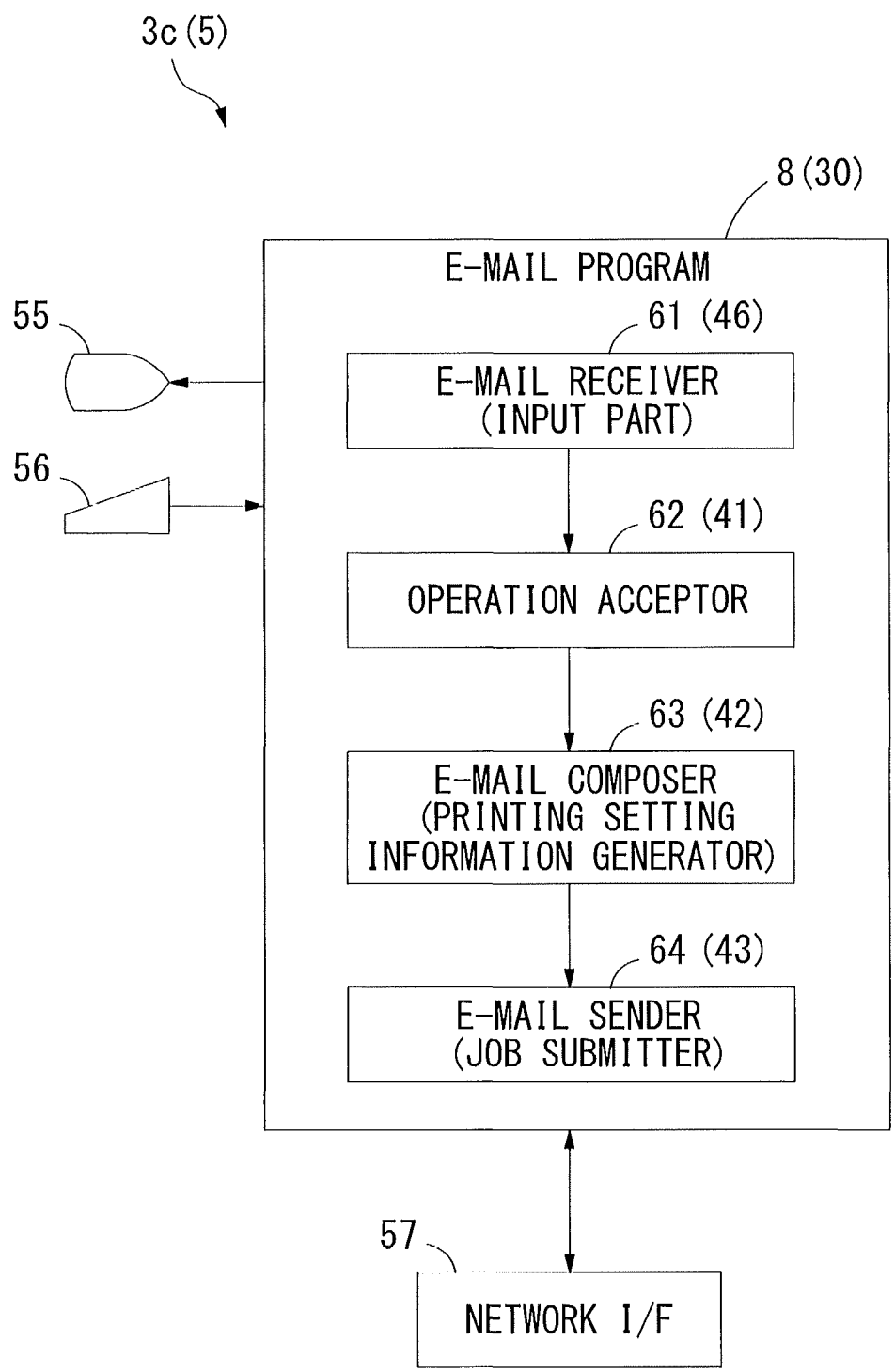
FIG. 10 is one example of a functional block diagram in a case where a mobile data terminal having an e-mail program being opened functions as a printing setting apparatus.

Next, FIG. 10 is one example of a functional block diagrams in a case where the mobile data terminal 3c functions as the printing setting apparatus 30 by start-up of the e-mail program 8 in the mobile data terminal 3c. As illustrated in FIG. 10, the e-mail program 8 started up in the mobile data terminal 3c causes the mobile data terminal 3c to function as an e-mail receiver 61, an operation acceptor 62, an e-mail composer 63, and an e-mail sender 64.

The e-mail receiver 61 periodically makes an access to a predetermined mail server via a network interface 57. Then, in a case where e-mails destined to an e-mail address of the mobile data terminal 3c are accumulated in the mail server, the e-mail receiver 61 automatically receives the e-mails. The e-mail receiver 61 also receives an e-mail which is sent from another printing setting apparatus 30 and additionally includes printing setting information. Thus, the e-mail receiver 61 functions as the input part 46 for receiving printing setting information.

The operation acceptor 62 accepts a user's operation for editing an e-mail (in other words, operation for printing setting) with the printing setting page G4 in FIG. 6A being displayed on a display part 55 of the mobile data terminal 3c. Subsequently, the operation acceptor 62 outputs control information in accordance with a user's operation, to the e-mail composer 63.

The e-mail composer 63 is a processing part for composing and editing an e-mail which is to be sent externally via the network interface 57, based on the control information received from the operation acceptor 62. The e-mail composer 63, upon receipt of control information directed to a subject space of an e-mail, puts the printing setting information D4 in the form of a text command in the subject space based on the received control information. Thus, the e-mail composer 63 functions as the printing setting information generator 42 for generating the printing setting information D4 in accordance with a user's instruction. Additionally, the printing setting information D4 is not necessarily input to a subject space of an e-mail, and may be input to a main message space of an e-mail.

The e-mail sender 64 is a processing part for externally sending an e-mail composed by the e-mail composer 63, from the network interface 57. In a case where an e-mail address of the image forming apparatus 2 is set at an address space of an e-mail, the e-mail sender 64 sends an e-mail for submitting a printing job using an e-mail printing function of the image forming apparatus 2. Thus, the e-mail sender 64 functions as the job submitter 43 for submitting a printing job to the image forming apparatus 2.

It should be noted that the foregoing processing parts 61, 62, 63, and 64 in the mobile data terminal 3c when the mobile data terminal 3c functions as the printing setting apparatus 30 are implemented by the e-mail program 8 which is a typical mailer software. Hence, even when the mobile data terminal 3c functions as the printing setting apparatus 30, the above-described functions of the converter 44 are not included, unlike the cases of the other printing setting apparatuses 30 illustrated in FIGS. 7, 8, and 9. Therefore, even when the e-mail program 8 is started up in the mobile data terminal 3c, the printing setting information D4 in the form of a text command which is input to a subject space of an e-mail cannot be converted into information in a different data format. Also, the printing setting information D1, D2, and D3 in a different data format cannot be converted into the printing setting information D4 suitable for e-mail printing.

For the above-described image forming system 1, a user can employ four possible methods for submitting a printing job to the image forming apparatus 2. Thus, a user can choose one method from the four methods, to submit a printing job to the image forming apparatus 2. In particular, according to the preferred embodiment, even in a case where the printer driver 6 is not installed in the computer 3b or the mobile data terminal 3c, data for printing stored in the computer 3b or the mobile data terminal 3c can be submitted to the image forming apparatus 2 as a printing job. Therefore, on a business trip, for example, a printing job can be submitted to the image forming apparatus 2 at the place where a user is staying. So, convenience of the customers is enhanced.

Also, in the image forming system 1 having the above-described structure, even in a case where a user submits a printing job to the image forming apparatus 2 with the use of the user interface 5 which the user is not accustomed to use, by converting a data format of printing setting information generated through printing setting made in a different user interface which the user is accustomed to use, and using the information in the converted data format, desired printing setting can be speedily reflected in the user interface 5 which the user is not accustomed to use. This provides advantages to the user, that even when a user submits a printing job with the use of a user interface which the user is not accustomed to an operation for printing setting, the user can make printing setting easily and efficiently. Hereinafter, specific modes in which printing setting information, of which data format is converted is used, will be described.

Figure 11A:
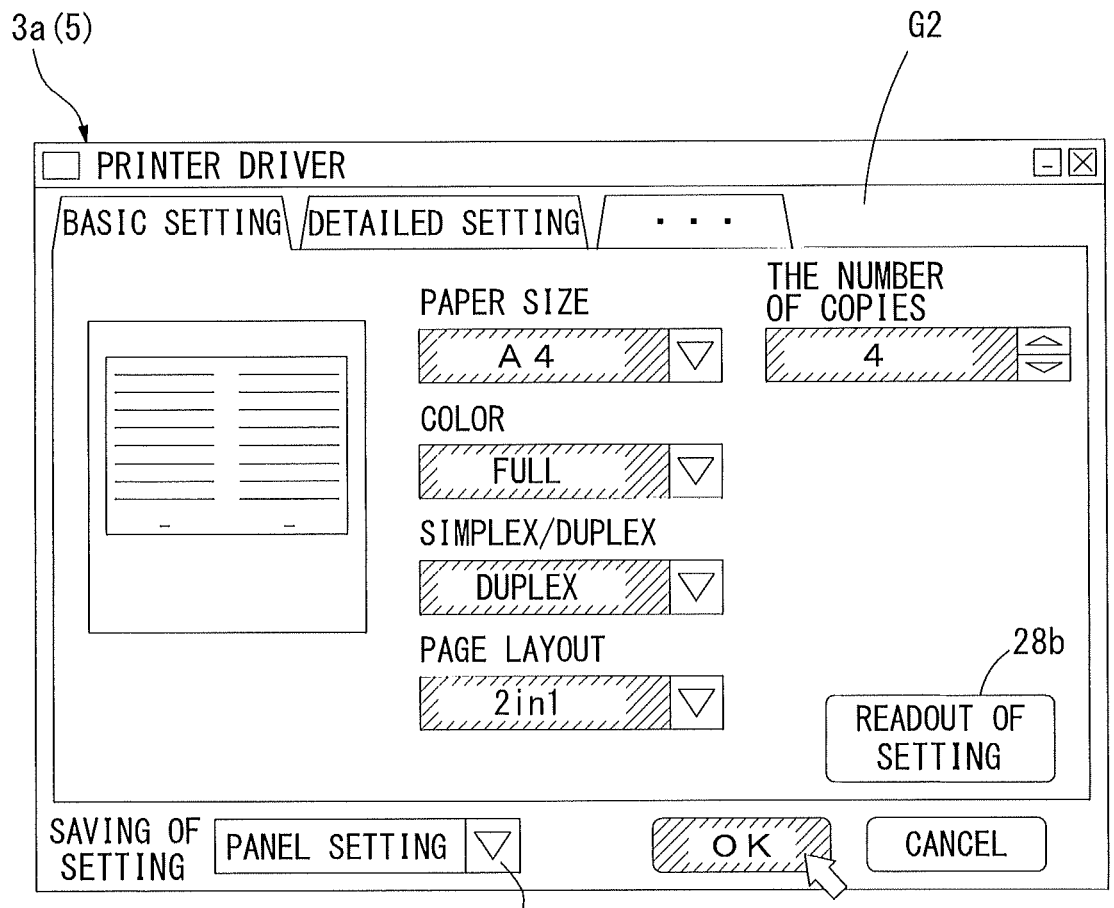
FIGS. 11A and 11B illustrate one example of an operation performed on a page for data conversion in order to use printing setting made in a printing setting page of a printer driver in a different user interface.
Figure 11B:
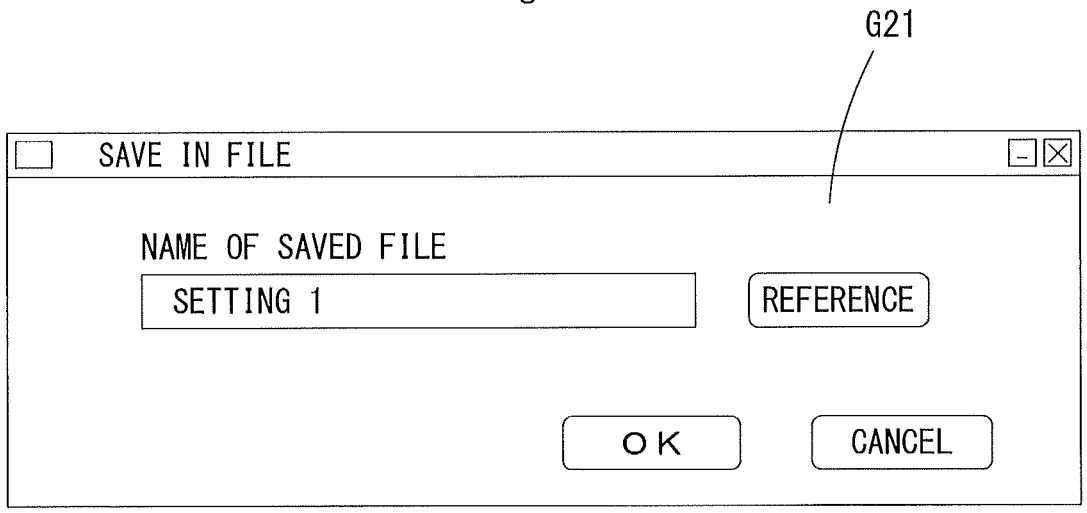

FIGS. 11A and 11B illustrate one example of an operation performed on a page for data conversion in order to use printing setting made in the printing setting page G2 of the printer driver 6 displayed on the computer 3a, in a different user interface 5. The printing setting page G2 in FIG. 11A indicates a state in which a user has performed an operation for making the same printing setting as in FIG. 4A. In that state, if the user operates the pull-down menu button 28a, to select conversion of a data format of the printing setting made in the printing setting page G2 into a particular data format which can be reflected in the operation panel 4 and saving of the resultant printing setting as illustrated in FIG. 11A, a setting page G21 illustrated in FIG. 11B appears on the display part 51 of the computer 3a. In the setting page G21, a user can arbitrarily designate a location of storage (destination of output), or a name of a saved file, of the printing setting information D1 resulted from conversion of a data format into a particular data format. For example, a user can output the printing setting information D1 to an external device such as a USB memory and save the printing setting information D1 therein, or a user can output the printing setting information D1 to the image forming apparatus 2 via the network interface 53 and save the printing setting information D1 therein.

Figure 12:
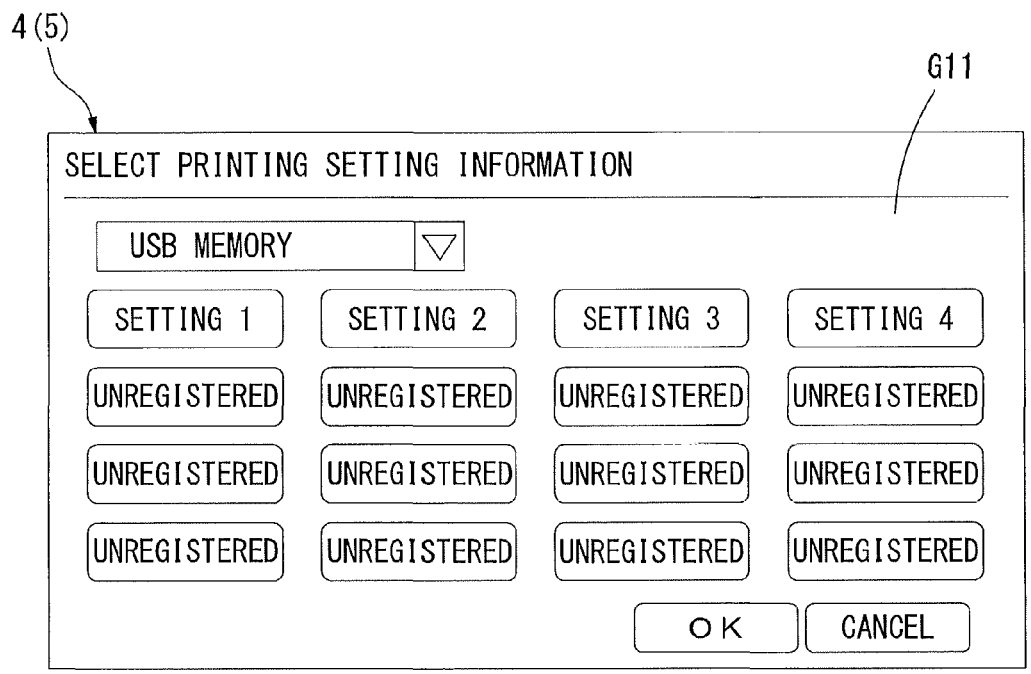
FIG. 12 illustrates one example of a setting page for causing printing setting to be reflected in an operation panel based on printing setting information generated in a different user interface.

FIG. 12 illustrates one example of a setting page G11 which causes printing setting to be reflected in the operation panel 4 based on printing setting information generated in a different user interface 5. The setting page G11 illustrated in FIG. 12 appears as a result of a user's operation on the setting reading button 27b while the printing setting page G1 illustrated in FIG. 3A is being displayed. For example, in a case where a user saves printing setting information based on printing setting which is made by activation of the printer driver 6 in an external device such as a USB memory as described above, the user first connects the external device to the external connection interface 13 of the image forming apparatus 2. Secondly, the user selects the external device as a target for read-out of printing setting information in the setting page G11, so that a list of pieces of printing setting information saved in the external device is displayed as illustrated in FIG. 12. Then, the user selects one piece of printing setting information which should be reflected in the printing setting page G1 of the operation panel 4 from the list illustrated in FIG. 12 and operates an enter (OK) button, so that printing setting based on the selected printing setting information is reflected in the printing setting page G1. At that time, if the printing setting information selected by the user is not in a particular data format which can be displayed on the operation panel 4, the above-described converter 44 is activated, to convert the printing setting information described in a different data format into the printing setting information D1 described in a particular data format.

Therefore, only by performing an operation for reading out printing setting information which has been fixed before with the use of the different user interface 5, the user can cause the same printing setting as the printing setting information which has been fixed before to be reflected in the printing setting page G1 of the operation panel 4, without performing an elaborate operation for making setting for each of a plurality of setting items included in the printing setting page G1. Thus, even in a case a user is not accustomed to an operation on the printing setting page G1 of the operation panel 4, a user can speedily cause printing setting made with the use of the different user interface 5 to be reflected in the printing setting page G1. This advantageously enhances efficiency in an operation for printing setting.

Figure 13A:
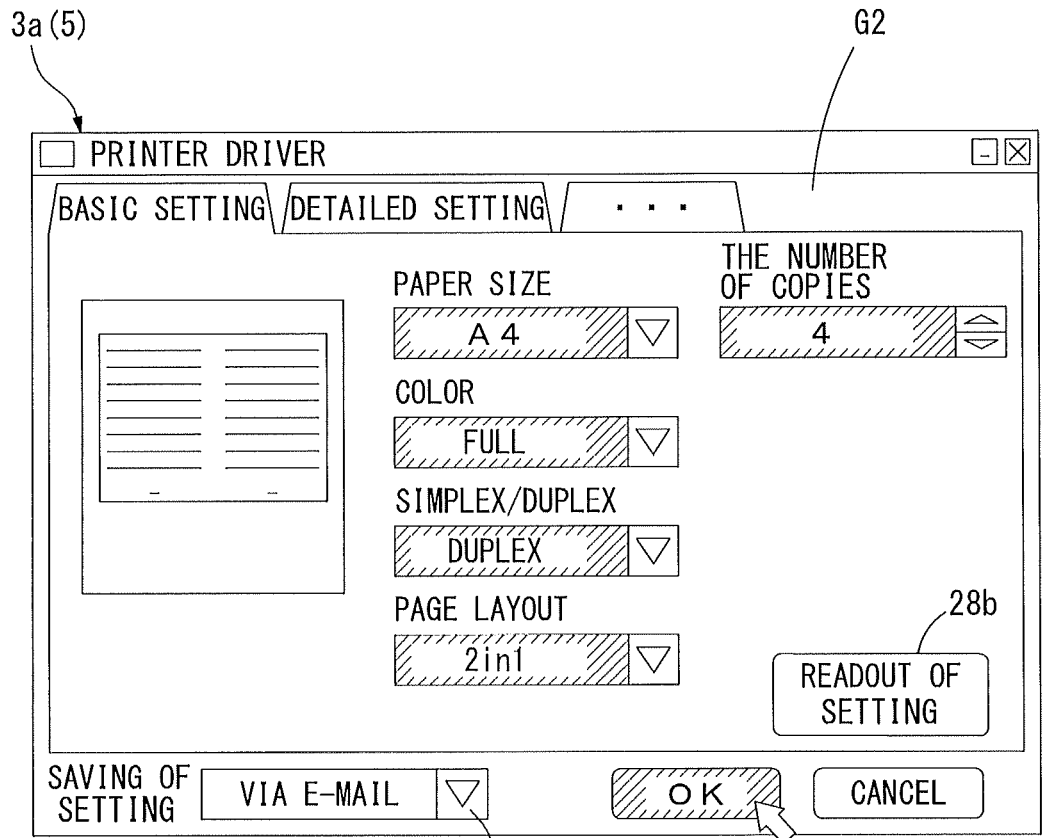
FIGS. 13A and 13B illustrate one example of an operation performed on a page for converting printing setting made in a printing setting page of a printer driver into printing setting information suitable for e-mail printing.
Figure 13B:
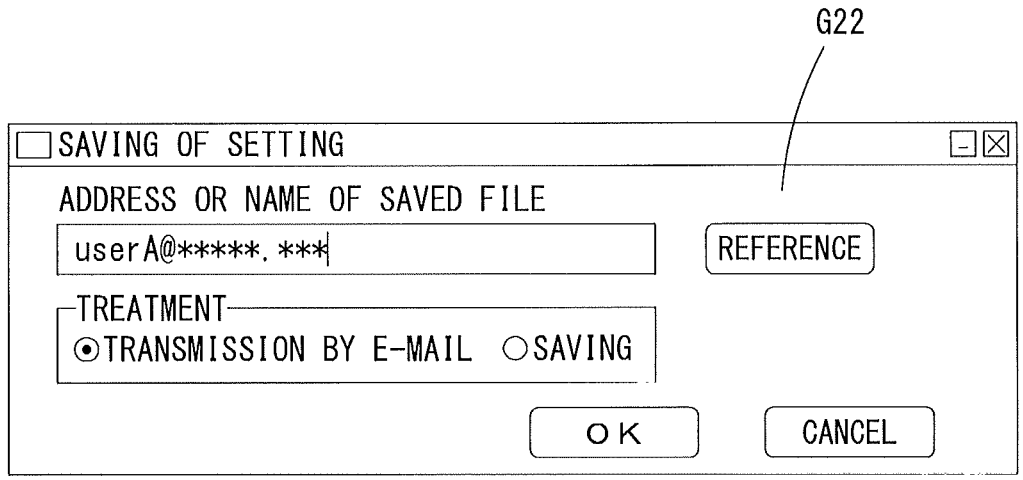

Next, FIGS. 13A and 13B illustrate one example of an operation performed on a page for converting printing setting made in the printing setting page G2 of the printer driver 6 which is displayed on the computer 3a, into the printing setting information D4 suitable for e-mail printing. Also the printing setting page G2 in FIG. 13A shows a state in which a user has performed an operation for making the same printing setting as in FIG. 4A. In that state illustrated in FIG. 13A, if the user operates the pull-down menu button 28a, to select conversion of the printing setting made in the printing setting page G2 into the printing setting information D4 in the form of a text command suitable for e-mail printing and output of the resultant information, a setting page G22 illustrated in FIG. 13B appears on the display part 51 of the computer 3a. In the setting page G22, selection of a mode of treatment for the printing setting information D4 between transmission by e-mail and saving in an external device or the like is possible. In a case where a user selects transmission by e-mail, by designating a an e-mail address of the mobile data terminal 3c which uses e-mail printing as a destination, for example, an e-mail additionally including the printing setting information D4 is sent to the destination. At that time, the above-described converter 44 generates the printing setting information D4 in the form of a text command based on the printing setting information D2 in a data format of PJL. Then, the above-described output part 45 automatically composes an e-mail additionally including the printing setting information D4 generated by the converter 44, and sends the composed e-mail to a destination designated by the user.

Figure 14:
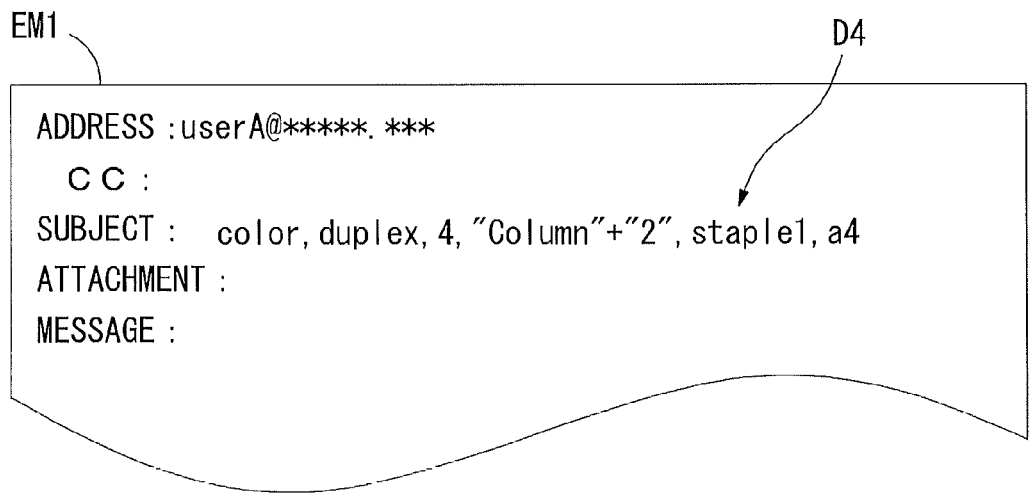
FIG. 14 illustrates one example of an e-mail which additionally includes printing setting information.

FIG. 14 illustrates one example of an e-mail EM1 which is composed by the output part 45 and additionally includes the printing setting information D4. As illustrated in FIG. 14, in transmitting the printing setting information D4 generated by the converter 44 via the e-mail EM1, the output part 45 adds the printing setting information D4 to a subject space of the e-mail EM1. A user of the mobile data terminal 3c previously sends the above-described e-mail EM1 to the mobile data terminal 3c. As a result of this, in transmitting a printing job for producing printouts using an e-mail printing function, by performing an operation for reply or forward to the e-mail EM1 which has already been received, the printing setting information D4 about printing setting which is desired by the user is inevitably included in the subject space of the e-mail EM1 which is to be edited. Thus, the user does not need to manually input the printing setting in formation D4 in the form of a text command by himself. Also, the user does not need remember a text command for making desired printing setting. Hence, to users, this provides advantages of improved operability in using an e-mail printing function of the image forming apparatus 2 and of enhanced ease of use of an e-mail printing function.

Figure 15A:
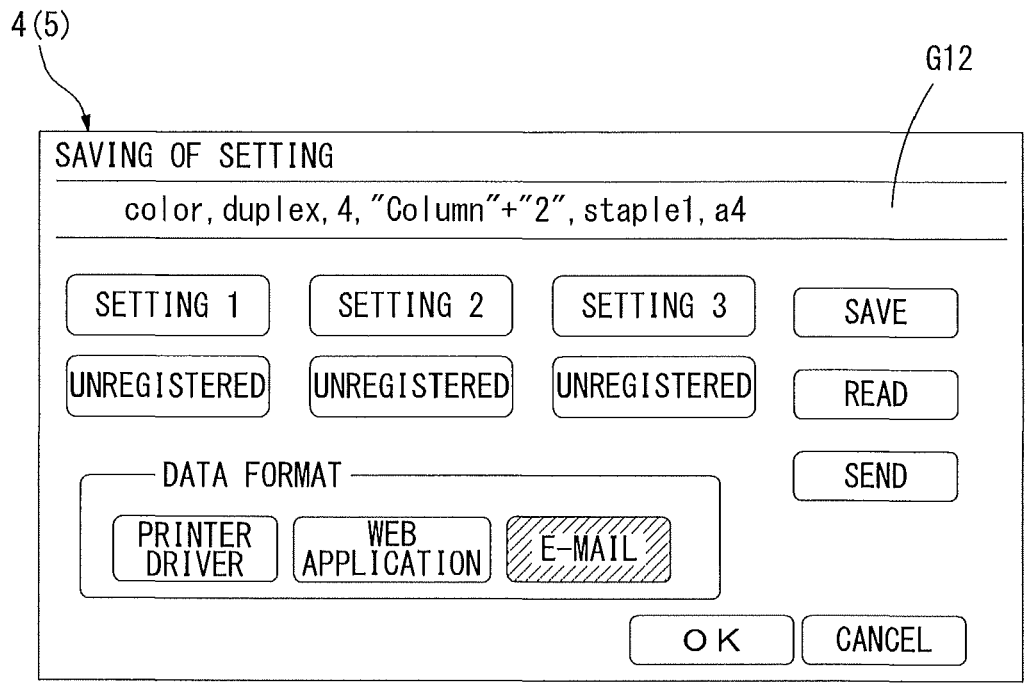
FIGS. 15A and 15B illustrate one example of an operation performed on a page for converting printing setting made in a printing setting page displayed on an operation panel into printing setting information suitable for e-mail printing.
Figure 15B:
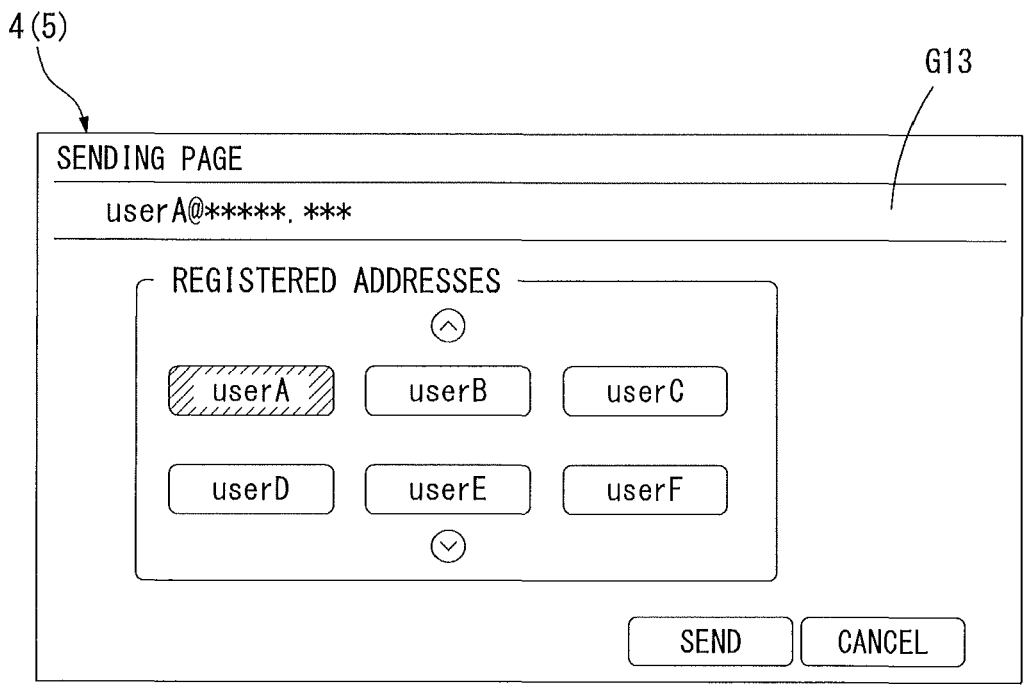

FIGS. 15A and 15B illustrate one example of an operation performed on a page for converting printing setting made in the printing setting page G1 displayed on the operation panel 4 into the printing setting information D4 for e-mail printing. For example, when a user operates the setting saving button 27a in the printing setting page G1 illustrated in FIG. 3A, a setting page G12 illustrated in FIG. 15A appears on the operation panel 4. In the setting page G12, a data format used at the time of saving or transmitting printing setting information based on printing setting made in the printing setting page G1 of the operation panel 4 can be designated. For example, if a user selects an e-mail as a data format, the above-described converter 44 is activated, to generate the printing setting information D4 in the form of a text command which allows for use of an e-mail printing function. Then, upon a user's operation on a send button, a sending page G13 illustrated in FIG. 15B appears on the operation panel 4. The sending page G13 allows a user to select an arbitrary destination from destinations previously registered in the image forming apparatus 2. Upon a user's operation on the send button after selecting a destination, the output part 45 automatically composes an e-mail additionally including the printing setting information D4 generated by the converter 44, and sends the e-mail to the destination selected by the user. The e-mail EM1 sent at that time is the same as that illustrated in FIG. 14.

Meanwhile, with respect to use of an e-mail printing function of the image forming apparatus 2, in a case where such function is used with the printing setting information D4 in the form of a text command being fixed in a subject space of an e-mail sent to the image forming apparatus 2 as described above, if the mobile data terminal 3c is a typical mobile phone, for example, there may possibly be a limit to the number of characters which can be input into a subject space depending on a carrier offering mobile phone service. A maximum number of characters in a subject space varies among carriers. One carrier limits the number of characters in a subject space to 100, and another carrier limits the number of characters in a subject space to 300. Otherwise, there is a carrier which does not impose any limit to the number of characters in a subject space.

In a case where the number of characters which can be input into a subject space is limited by a carrier offering mobile phone service, when an e-mail includes characters in the number exceeding the maximum number in a subject space thereof, the characters are possibly cut on a transmission path so that the total number of characters can fall within the limits. If this happens, the printing setting information D4 described in the form of a text command cannot be correctly sent to the image forming apparatus 2. For example, in a case where a subject space of the e-mail EM1 illustrated in FIG. 14 includes 38 characters and a user uses carriers which limits the number of characters in a subject space to 30, the printing setting information D4 cannot be correctly sent to the image forming apparatus 2.

In view of the foregoing matters, the image forming apparatus 2 according to the preferred embodiment of the present invention is designed so as to accept not only a command set including each command described in full text as illustrated in FIG. 14, but also a command set including an abbreviated command in which the number of characters is reduced, for the printing setting information D4 provided in a subject space of an e-mail. An abbreviated command which can be accepted by the image forming apparatus 2 is previously registered in the image forming apparatus 2 at the time of shipping, for example. More specifically, an abbreviated command "cl" as corresponding to a command "color" which gives an instruction for full-color printout, an abbreviated command "dp" as corresponding to a command "duplex" which gives an instruction for duplex printing, and the like, are previously registered.

Further, according to the preferred embodiment, when the output part 45 composes and sends an e-mail additionally including the printing setting information D4 generated by the converter 44 to an e-mail address designated by a user as described above, the output part 45 identifies a carrier based on a domain name of the e-mail address and adds an abbreviated command to the subject space of the e-mail as needed. For example, in a case where a carrier is identified to be a carrier which fixes the maximum number of characters in a subject space, the output part 45 compares the maximum number (N1) and the number (N2) of characters of the printing setting information D4 generated by the converter 44. If the number (N2) of characters exceeds the maximum number (N1), the output part 45 abbreviates each command of a command set included in the printing setting information D4, and adds a resultant command set to a subject space.

On the other hand, if the number (N2) of characters does not exceed the maximum number (N1), the output part 45 adds, not an abbreviated command, but the printing setting information D4 generated by the converter 44, to a subject space without performing any process thereon, and sends the e-mail. That is, in this case, each command of a command set included in the printing setting information D4 is added to a subject space of an e-mail while being described in full text. When each command of a command set is described in full text, a user can relatively easily recognize for what printing setting is requested by a command, at a glance of the command. This provides advantages that whether or not desired printing setting is made can be relatively easily confirmed.

In contrast thereto, in a case where each command of a command set is abbreviated and added to a subject space as described above, a user cannot easily recognize for what printing setting is requested by a command and thus has a difficulty in confirming whether or not desired printing setting is made. For this reason, it is preferable that when each command of a command set included in the printing setting information D4 is abbreviated and added to a subject space of an e-mail, the output part 45 provides a message including supplemental comments stating that an abbreviated command is added to a subject space and a non-abbreviated form of the printing setting information D4, in a main message space or an attached file of the e-mail, and sends the e-mail.

Figure 16:
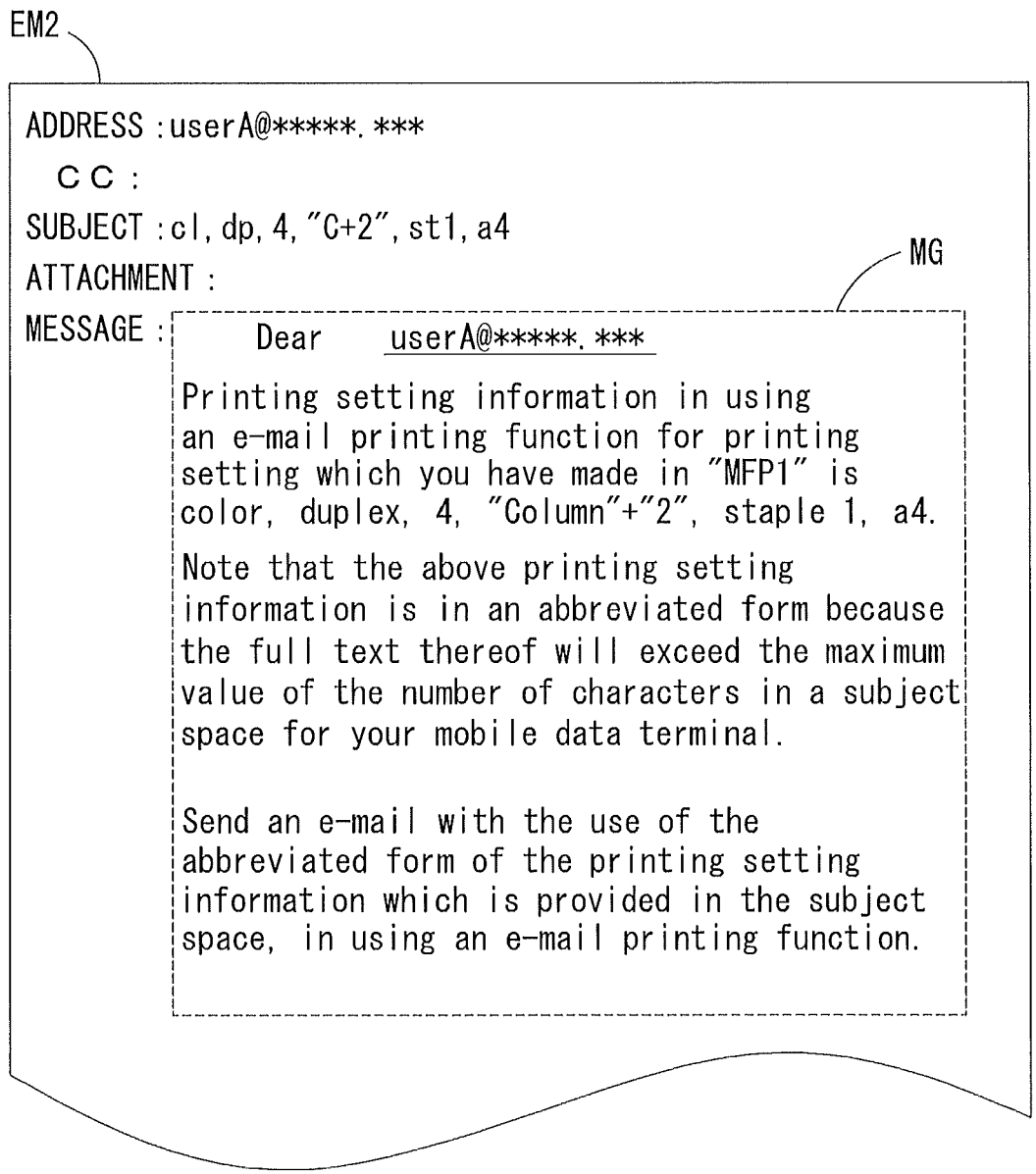
FIG. 16 illustrates another example of an e-mail message which additionally includes printing setting information.

FIG. 16 illustrates one example of an e-mail EM2 in the above-described case. For example, in a case where the converter 44 generates the printing setting information D4 illustrated in FIG. 14 and the maximum number (N1) of the characters of a carrier identified based on an e-mail address (destination) is 30, respective abbreviations of commands included in the printing setting information D4 are added to a subject space of the e-mail EM2 as illustrated in FIG. 16. In this case, the output part 45 provides a message MG including supplemental comments stating that abbreviated commands are added to the subject space and a non-abbreviated version of the printing setting information D4, in a main body of the e-mail EM2. However, the message MG is not necessarily provided in the main body, but may be added as an attached file. With provision of such the message MG, a user can check description of each command in full text, so that the user can relatively easily confirm whether or not desired printing setting is made.

It is additionally noted that though both supplemental comments stating that abbreviated commands are added to a subject space and a non-abbreviated version of the printing setting information D4 are included in the message MG in the example illustrated in FIG. 16, the message MG may include only either supplemental comments or a non-abbreviated version of the printing setting information D4.

Also, though an example of an operation on a page for data conversion has been described above while featuring on some of the plurality of user interfaces 5, the same as described above holds true for the other user interfaces 5 except the e-mail program 8.

Next, an example of a specific procedure used in the printing setting apparatus 30 performs its functions by virtue of each of the printer driver 6, the web application 9, and the panel controller 15 will be described. FIGS. 17, 18, 19, and 20 are flow charts illustrating examples of specific procedures used in the printing setting apparatus 30.

Figure 17:
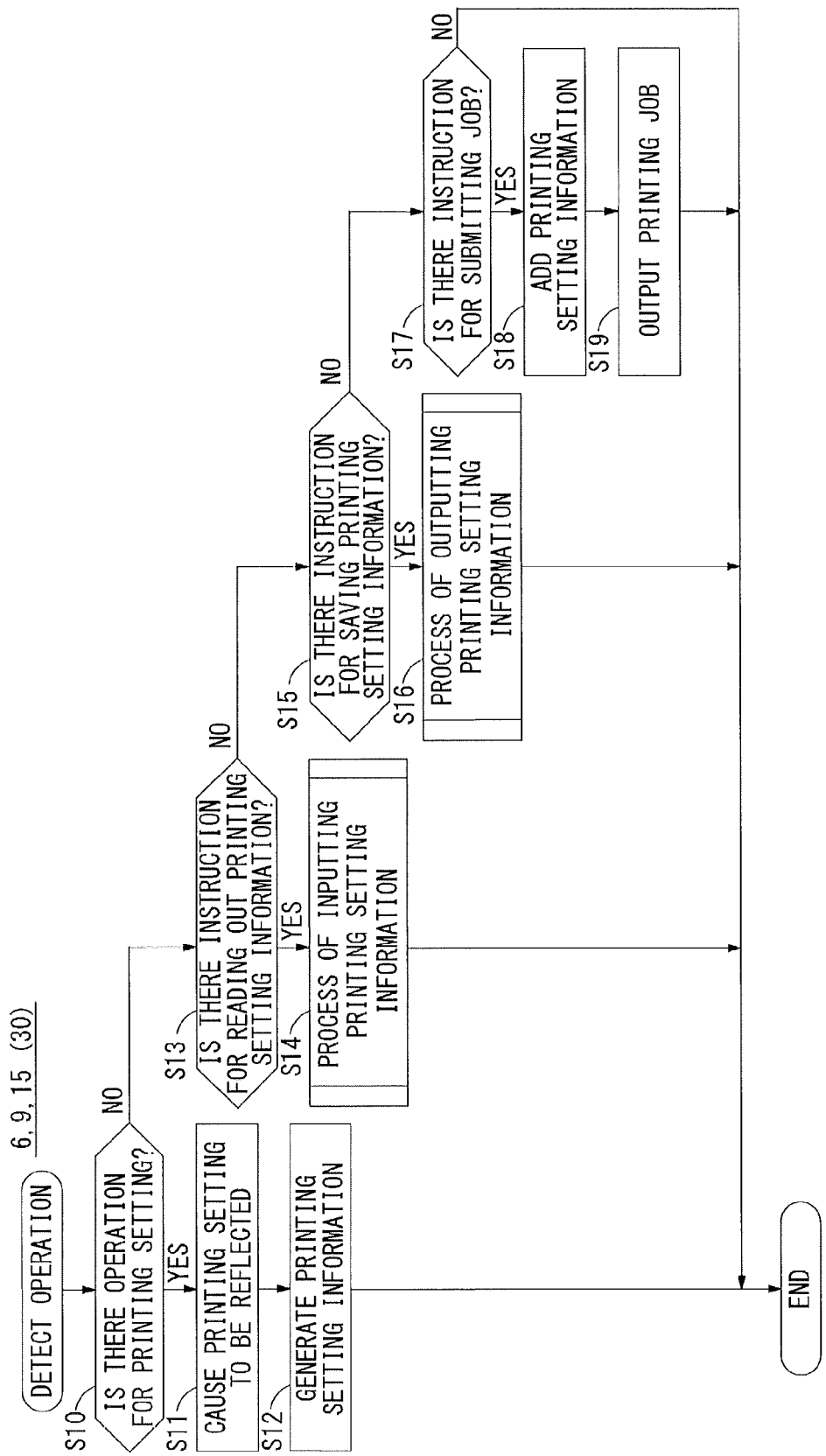
FIG. 17 is a flow chart illustrating one example of a specific procedure used in a printing setting apparatus.

First, a flow chart of FIG. 17 includes a main sequence of processes which are carried out in the printing setting apparatus 30 every time a user's operation is detected. Upon detection of a user's operation, the printing setting apparatus 30 determines whether or not the operation is an operation for printing setting (step S10). If the user's operation is an operation for printing setting ("YES" in the step S10), the printing setting apparatus 30 causes printing setting to be reflected in one of the printing setting pages G1, G2, and G3 in accordance with the user's operation (step S11), and generates one of the printing setting information D1, D2, and D3 based on the printing setting (step S12). Then, a process based on an operation for printing setting is finished.

On the other hand, if a user's operation is not an operation for printing setting ("NO" in the step S10), the printing setting apparatus 30 determines whether or not the user's operation is an instruction for reading out printing setting information (step S13). If the user's operation is an instruction for reading out printing setting information ("YES" in the step S13), the printing setting apparatus 30 carries out a process of inputting printing setting information (step S14), Details of the process of inputting printing setting information (step S14) will be later provided. Then, when the process of inputting printing setting information is completed, a process based on an instruction for reading out is finished.

Alternatively, if a user's operation is not an instruction for reading out ("NO" in the step S13), the printing setting apparatus 30 determines whether or not the user's operation is an instruction for saving printing setting information (step S15). If the user's operation is an instruction for saving printing setting information ("YES" in the step S15), the printing setting apparatus 30 carries out a process of outputting printing setting information (step S16). Details of the process of outputting printing setting information (step S16) will be later provided. Then, when the process of outputting printing setting information is completed, a process based on an instruction for saving is finished.

Further alternatively, if a user's operation is not an instruction for saving ("NO" in the step S15), the printing setting apparatus 30 determines whether or not the user's operation is an instruction for submitting a job (step S17). If the user's operation is an instruction for submitting a job ("YES" in the step S17), the printing setting apparatus 30 adds one of the printing setting information D1, D2, and D3 to a printing job which is to be submitted to the image forming apparatus 2 (step S18), and outputs the resultant printing job to the image forming apparatus 2 (step S19). Then, when submission of the job is completed, a process based on an instruction for submission is finished.

Moreover, if a user's operation is not an instruction for submitting a job ("NO" in the step S17), the printing setting apparatus 30 carries out the other process in accordance with the user's operation, for example, and stops.

Figure 18:
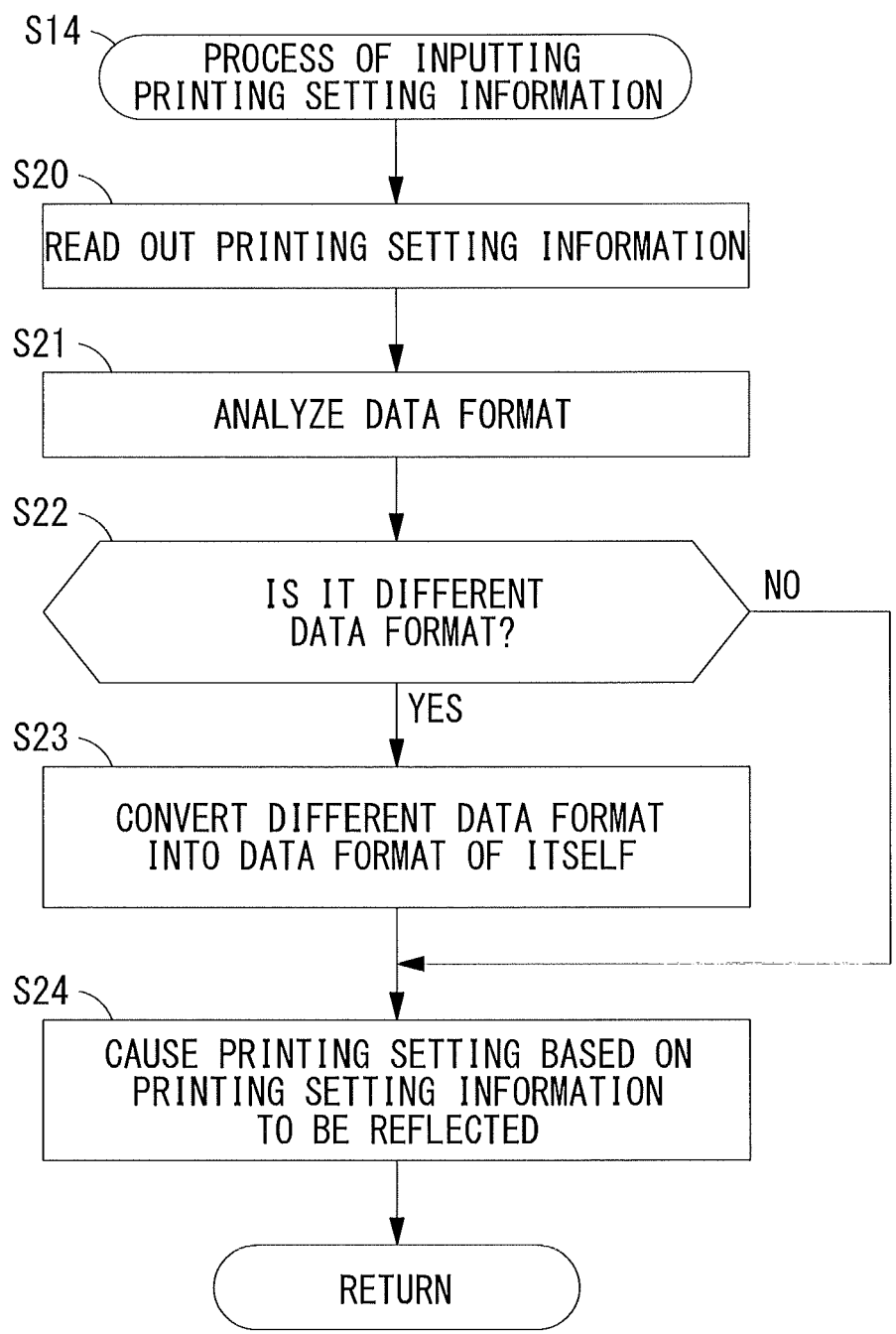
FIG. 18 is a flow chart illustrating one example of a detailed procedure in a process of inputting printing setting information.

FIG. 18 is a flow chart illustrating one example of a detailed procedure of the process of inputting printing setting information (step S14). With a start of this process, the printing setting apparatus 30 reads out printing setting information designated by a user (step S20), and analyzes a data format of the read printing setting information (step S21). Then, the printing setting apparatus 30 determines whether the read printing setting information is information described in a data format which can be processed in the printing setting apparatus 30 or information described in a different data format (step S22).

If the read printing setting information is information described in a different data format ("YES" in step S22), the printing setting apparatus 30 converts the printing setting information into information in a data format which can be processed by the printing setting apparatus 30 (step S23). Additionally, if the read printing setting information is in a data format which can be processed by the printing setting apparatus 30 ("NO" in the step S22), the process of conversion in the step S23 is unnecessary.

Subsequently, the printing setting apparatus 30 causes printing setting to be reflected in one of the printing setting pages G1, G2, and G3, based on the printing setting information in a data format which can be processed by itself (step S24). Then, the process of inputting printing setting information (step S14) is finished.

Figure 19:
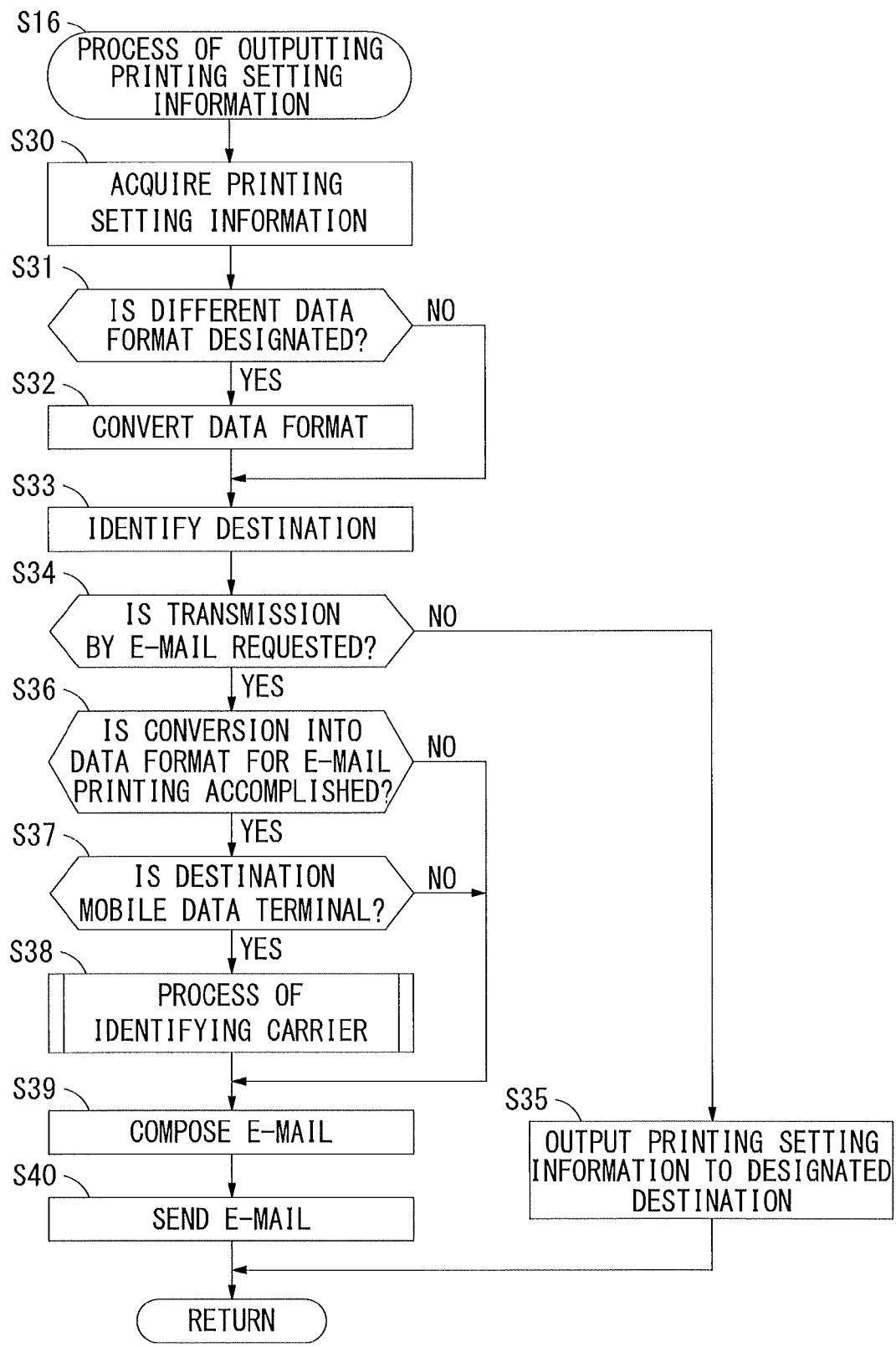
FIG. 19 is a flow chart illustrating one example of a detailed procedure in a process of outputting printing setting information.

FIG. 19 is a flow chart illustrating one example of a detailed procedure in the process of outputting printing setting information (step S16). With a start of this process, the printing setting apparatus 30 acquires printing setting information which is being reflected in a current printing setting page (step S30). Subsequently, the printing setting apparatus 30 checks whether or not a different data format is designated by a user (step S31). If a different data format is designated ("YES" in the step S31), conversion of data format is made (step S32). If a different data format is not designated by a user ("NO" in the step S31), conversion of data format is not made.

After the printing setting apparatus 30 acquires printing setting information in a data format designated as suitable for output in the above-described manner, the printing setting apparatus 30 identifies a destination of output (step S33), and determines whether or not transmission by e-mail is requested by a user (step S34). If transmission by e-mail is not requested by a user ("NO" in the step S34), the printing setting apparatus 30 outputs the printing setting information as a target of output, to the destination designated by a user (step S35).

On the other hand, if transmission by e-mail is requested by a user ("YES" in the step S34), the printing setting apparatus determines whether or not conversion into a data format suitable for e-mail printing is made in the step S32 (step S36). If conversion into a data format suitable for e-mail printing is made ("YES" in the step S36), the printing setting apparatus 30 further determines whether or not a destination of transmission designated by a user (e-mail address) is a mobile data terminal (step S37). If a mobile data terminal is designated as a destination of transmission ("YES" in the step S37), the printing setting apparatus 30 carries out a process of identifying a carrier (step S38).

Figure 20:
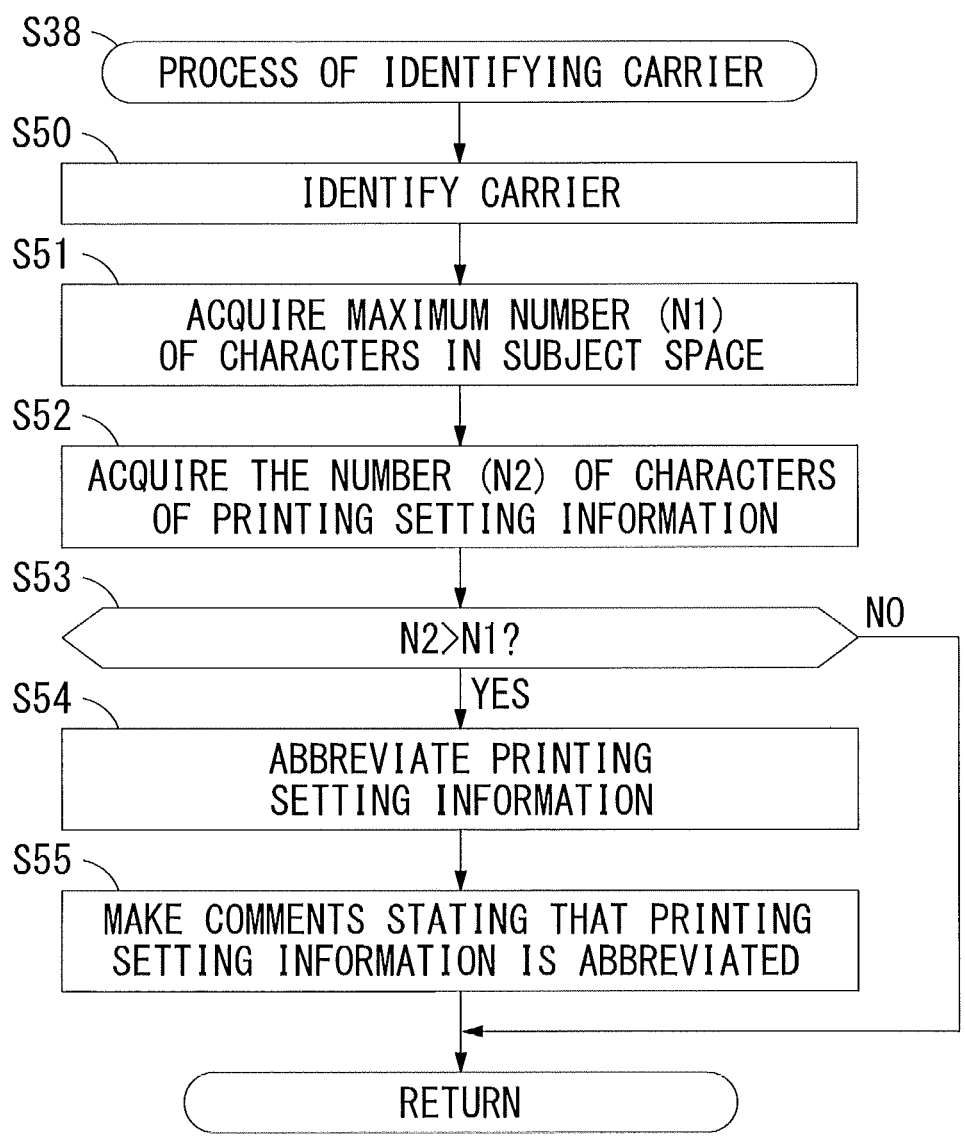
FIG. 20 is a flow chart illustrating one example of a detailed procedure in a process of identifying a carrier.

FIG. 20 is a flow chart illustrating one example of a detailed procedure in the process of identifying a carrier (step S38). With a start of this process, the printing setting apparatus 30 identifies a carrier based on an e-mail address designated by a user (step 50), and acquires a maximum number (N1) of characters in a subject space which is fixed by the carrier (step the S51). The maximum number (N1) is previously registered in the printing setting apparatus 30. Subsequently, the printing setting apparatus 30 acquires the number (N2) of characters of printing setting information, a data format of which has been converted into a data format for e-mail printing (step S52), to check whether or not the number (N2) of characters of the printing setting information exceeds the maximum number (N1) (step S53). Then, if the number (N2) of characters of the printing setting information exceeds the maximum number (N1) ("YES" in the step S53), the printing setting apparatus 30 generates an abbreviation of the printing setting information (step S54), and further generates a message MG indicating that the printing setting information is in an abbreviated form (step S55). Additionally, if the number (N2) of characters of the printing setting information does not exceed the maximum number (N1) ("NO" in the step S53), the processes in the steps S54 and S55 are not carried out. Then, the process of identifying a carrier (step S38) is finished.

Referring back to the flow chart of FIG. 19, the printing setting apparatus 30 subsequently composes an e-mail which is to be sent to the destination designated by a user (step S39), and sends the composed e-mail (step S40). Then, the processes carried out by the printing setting apparatus 30 in a case where a user's operation is detected is finished.

As a result of the above-described processes carried out in each of the printer driver 6, the web application 9, and the panel controller 15, the printing setting apparatus 30 can convert printing setting information in one data format which is generated in accordance with a user's operation for printing setting, into printing setting information in a different data format, and output the resultant printing setting information. Also, the printing setting apparatus 30 receives printing setting information in a different data format, and converts the different data format into one data format which can be processed by itself, to thereby cause printing setting to be reflected in a printing setting page thereof. Further, in sending an e-mail additionally including the printing setting information D4 for e-mail printing to the mobile data terminal 3c which does not have a function of converting a data format, the printing setting information D4 in an appropriate form for each carrier that the mobile data terminal 3c uses is added to a subject space of an e-mail.

Therefore, according to the preferred embodiment of the present invention, even in submitting a printing job to the image forming apparatus 2 with the use of the user interface 5 which a user is not accustomed to use, the user can effectively use printing setting which has been made before with the use of another user interface 5. This increases efficiency in an operation for printing setting. In particular, a user of the mobile data terminal 3c can more easily use an e-mail printing function because there is no need of remembering a text command for using an e-mail printing function in the image forming apparatus 2.

Next, processes carried out by the panel controller 15 (the printing setting apparatus 30) in response to a user's selection of document data through an operation on the operation panel 4 in a case where document data for printing (or a printing job) is stored in the memory 14 of the image forming apparatus 2, will be described.

Figure 21:
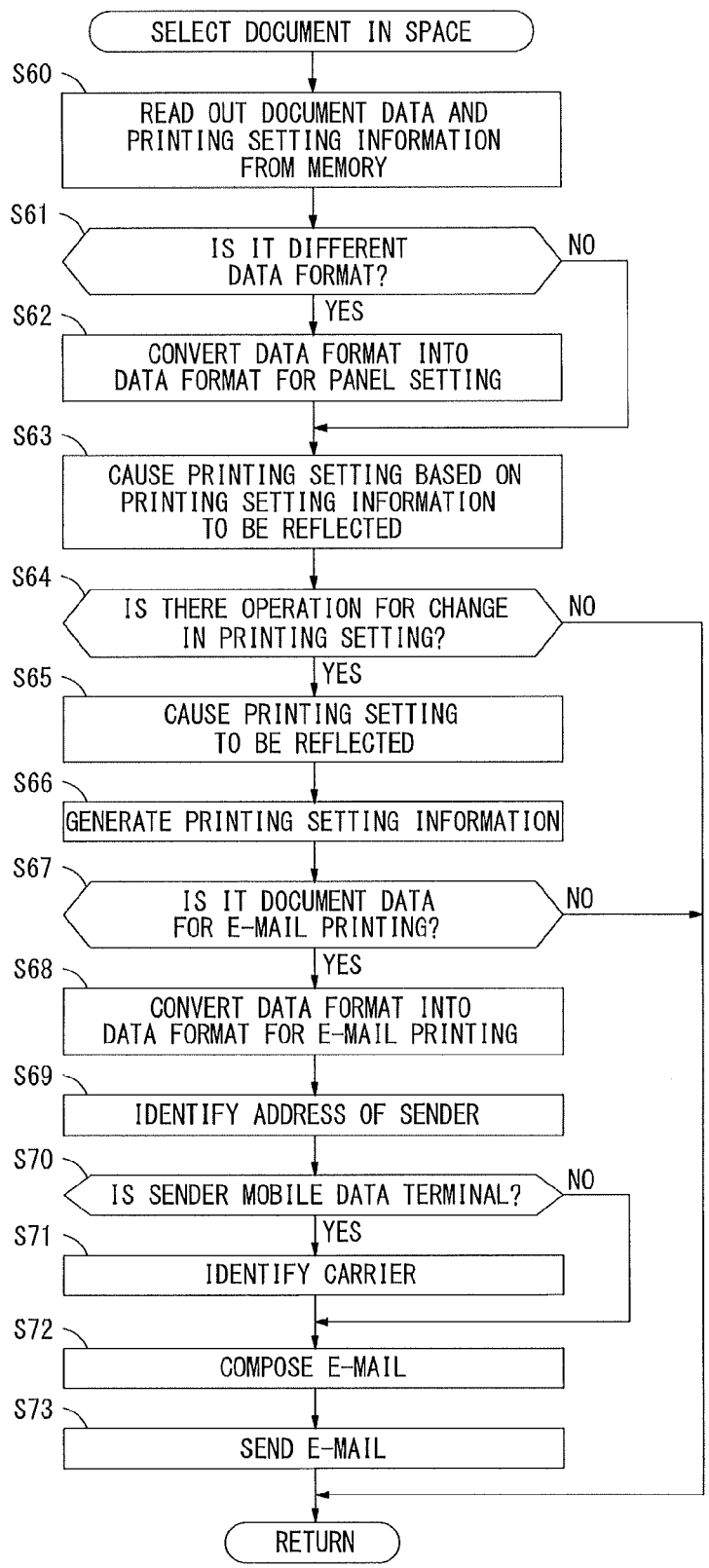
FIG. 21 is a flow chart illustrating one example of a procedure used in a panel controller in a case where document data stored in a box of a memory is selected by a user.

FIG. 21 is a flow chart illustrating one example of a procedure used in the panel controller 15 when a user selects document data stored in a box within the memory 14. With a start of this process, the panel controller 15 reads out document data designated by the user and printing setting information added to the document data from the memory 14 (step S60). Subsequently, the panel controller 15 determines whether or not the printing setting information added to the document data is printing setting information in a different data format (step S61). If the printing setting information is in a different data format ("YES" in the step S61), the panel controller 15 converts the printing setting information into the printing setting information D1 in a particular data format which is suitable for panel setting (step S62). Then, the panel controller 15 causes printing setting information based on the printing setting information D1 to be reflected in the printing setting page G1 (step S63).

Thereafter, the panel controller 15, upon the user's operation for changing printing setting ("YES" in the step S64), updates the printing setting page G1 based on the change of printing setting (step S65) and generates the printing setting information D1 corresponding to the change of printing setting (step S66). In this manner, when a user changes printing setting of document data stored in the memory 14, the panel controller 15 determines whether or not the read document data is document data included in an attached file of an e-mail in order to use an e-mail printing function (step S67). If the read document data is document data attached to an e-mail in order to use an e-mail printing function ("YES" in the step S67), the panel controller 15 converts the printing setting information D1 generated in the step S66 into the printing setting information D4 for e-mail printing (step S68) and identifies an address of a sender of the e-mail (step S69).

Then, the panel controller 15 determines whether or not the address of a sender is the mobile data terminal 3c (step S70). If the address of a sender is the mobile data terminal 3c (step S70), the panel controller 15 carries out the process of identifying a carrier (step S71). Details of the process of identifying a carrier (step S71) are the same as in the flow chart of FIG. 20. In short, the printing setting information D4 is converted into an abbreviated form depending on a carrier of the mobile data terminal 3c. After that, the panel controller 15 composes an e-mail which is to be sent to the address of the sender (step S72), and sends the e-mail (step S73).

Therefore, when a user of the mobile data terminal 3c reads out document data attached to the e-mail, and changes printing setting by operating the operation panel 4 after sending an e-mail for producing printouts with the use of an e-mail printing function, to the image forming apparatus 2, an e-mail additionally including the printing setting information D4 based on the changed printing setting is sent to the mobile data terminal 3c of the user. As a result, the user can acquire a text command for achieving printing setting which has been changed by an operation on the operation panel 4. This advantageously eliminates a need of repeatedly performing the same operation on the operation panel 4 after sending an e-mail for utilizing an e-mail printing function.

As is described above, the image forming system 1 according to the preferred embodiment of the present invention has a structure which allows a user to submit a printing job to the image forming apparatus 2 with the use of a plurality of user interfaces 5. Also, respective pieces of printing setting information generated in accordance with the user's operation for printing setting with the use of the plurality of the user interfaces 5 are in respective data formats which are different with one another. In the foregoing structure, the printing setting apparatus 30 according to the preferred embodiment is capable of converting printing setting information in one data format which is generated in accordance with a user's operation for printing setting, into printing setting information in a different data format, and outputting the resultant printing setting information. Thus, even in a case where a user makes printing setting using the user interface 5 which the user is not accustomed to use, by previously making printing setting using the user interface 5 which the user is accustomed to use, previously converting printing setting information based on the printing setting into information in a different data format, and outputting the resultant information, the user can perform an operation for printing setting with the same printing setting being efficiently reflected.

The foregoing feature is advantageous particularly in a case where a user produces printouts with the use of an e-mail printing function of the image forming apparatus 2. Specifically, even if a user does not know a text command for printing setting, by previously achieving desired printing setting using a different user interface 5, converting printing setting information based on the desired printing setting into information in a data format suitable for e-mail printing, and transmitting the resultant information, the user can easily put a text command for desired printing setting in using an e-mail printing function of the image forming apparatus 2, with significant advantages.

Also, the printing setting apparatus 30 according to the preferred embodiment, upon receipt of printing setting information described in a different data format, can convert the received printing setting information into printing setting information described in a data format which can be processed by itself, and submit a printing job to which the printing setting information provided after the conversion is added, to the image forming apparatus 2. In other words, even if the printing setting apparatus 30 receives printing setting information generated in a different user interface 5, the printing setting apparatus 30 can convert the received printing setting information into printing setting information appropriate to the user interface 5 of itself, and use it. Therefore, even in a case where a user makes printing setting with the use of the user interface 5 which the user is not accustomed to use, by previously making printing setting with the use of the user interface 5 which the user is accustomed to use, previously converting printing setting information based on the printing setting into information in an arbitrary data format, and outputting the resultant information, the user can efficiently perform an operation for printing setting with the same printing setting being reflected.

Thus, the image forming system 1 according to the preferred embodiment allows easy and efficient printing setting when a user submits a printing job to the image forming apparatus 2 with the use of the user interface 5 which the user is not accustomed to use, to thereby significantly improve the operability at the time of submitting a printing job.

While the preferred embodiment of the present invention has been described as above, the present invention is not limited to the above description and many modifications and variations are possible. For example, while the four user interfaces 5 for submitting a printing job to the image forming apparatus 2 are cited above as examples, the above-cited four user interfaces 5 are not indispensable. Also, another user interface different from the above-cited four user interfaces 5 may be further included.

Further, the above description has principally dealt with a case where, for conversion of a data format, a data format is converted into a data format designated by a user, as one example. However, the present invention is not limited to such example, and a data format may be converted into a common data format as mentioned above. In this case, if the printing setting apparatus 30 converts a data format and then produces outputs, for example, conversion into printing setting information in one common data format which can be interpreted by all of the other user interfaces 5 in common, is made. Such common data format may be implemented by employing one of the above-cited four user interfaces 5, or alternatively implemented by employing another user interface different from any of the user interfaces 5. As a result of fixing one common data format, each of the user interfaces 5 can ensure compatibility of printing setting information with the other user interfaces 5 by simply having the ability to analyze only one common data format beside a data format which can be processed by itself. This eliminates a need for each of the user interfaces 5 to analyze the other data formats different from the common data format, which advantageously lightens a processing burden. For example, by employing a data format suitable for e-mail printing as a common data format, it is possible to lighten a processing burden of each of the user interfaces 5 without loss of convenience of the customers in using an e-mail printing function.

What is claimed is:

1. A printing setting apparatus for generating printing setting information described in one data format among plural types of data formats and submitting a printing job to an image forming apparatus capable of executing a printing job based on printing setting information described in said plural types of data formats, the printing setting apparatus comprising a controller configured to:

accept a user's operation for input;

make a printing setting based on the accepted user's operation for input;

generate printing setting information described in said one data format based on said printing setting;

convert said printing setting information from said one data format into another data format among said plural types of data formats; and output said printing setting information which is converted into said another data format.

2. The printing setting apparatus according to claim 1, wherein said processor identifies another data format designated by a user based on said control information received by said processor, and converts said printing setting information described in said one data format into said printing setting information described in said another data format.

3. The printing setting apparatus according to claim 1, wherein said processor converts said printing setting information described in said one data format into printing setting information described in a common data format which is analyzable by other devices.

4. The printing setting apparatus according to claim 1, wherein said image forming apparatus has an e-mail printing function of producing printouts based on a received e-mail and is capable of executing a printing job based on printing setting information described in text as one of said plural types of data formats in a received e-mail, and said processor converts said printing setting information which is generated by said processor and described in said one data format into said printing setting information described in text for producing printouts using said e-mail printing function of said image forming apparatus.

5. The printing setting apparatus according to claim 4, wherein said processor is further configured to add said printing setting information described in text to an e-mail, and to send said e-mail to a designated e-mail address.

6. The printing setting apparatus according to claim 5, wherein said processor is further configured to add said printing setting information described in text to a subject space of said e-mail, and to send said e-mail.

7. The printing setting apparatus according to claim 6, wherein when the number of characters of said printing setting information described in text exceeds a maximum number of characters in a subject space of an e-mail, said processor adds an abbreviation of said printing setting information in a smaller number of characters than that of said printing setting information described in text, to a subject space of an e-mail.

8. The printing setting apparatus according to claim 7, wherein when the number of characters of said printing setting information described in text exceeds a maximum number of characters in a subject space of an e-mail, said processor adds comments stating that an abbreviation of said printing setting information in a smaller number of characters than that of said printing setting information described in text is added to a subject space of an c-mail, to a main body or an attached file of an e-mail.

9. The printing setting apparatus according to claim 6, wherein when the number of characters of said printing setting information described in text exceeds a maximum number of characters in a subject space of an e-mail, said output part adds said printing setting information described in text to a main body of an e-mail.

10. The printing setting apparatus according to claim 6, wherein when the number of characters of said printing setting information described in text exceeds a maximum number of characters in a subject space of an e-mail, said processor adds said printing setting information described in text to an attached file.

11. A printing setting apparatus for generating printing setting information described in one data format among plural types of data formats and submitting a printing job to an image forming apparatus capable of executing a printing job based on printing setting information described in said plural types of data formats, the printing setting apparatus comprising a controller configured to:

receive printing setting information described in another data format which is included in said plural types of data formats and which is different from said one data format;

convert said another data format of printing setting information which is received into said one data format; and add said printing setting information which is converted into said one data format to a printing job; and submit said printing job to said image forming apparatus.

12. The printing setting apparatus according to claim 11, wherein the processor is further configured to cause said printing setting information which is generated by said processor and described in said one data format to be reflected in a printing setting page, and outputting said printing setting page.

13. The printing setting apparatus according to claim 12, wherein the processor is further configured to accept an operation for input performed on said printing setting page; and to make a change in printing setting reflected in said printing setting page, based on control information received by said processor, and to update said printing setting information which is generated by said converter based on said change and described in said one data format.

14. The printing setting apparatus according to claim 13, wherein when said printing setting information described in said one data format is updated by said processor, said processor converts said printing setting information described in said one data format into said printing setting information in said another data format.

15. The printing setting apparatus according to claim 14, wherein the processor is further configured to output said printing setting information which is generated by said processor and described in said another data format.

16. The printing setting apparatus according to claim 15, wherein said image forming apparatus has an e-mail printing function for producing printouts based on a received e-mail, and is capable of executing a printing job based on printing setting information described in text as one of said plural types of data formats, in a received e-mail, and said printing setting information described in said another data format is printing setting information described in text for producing printouts using said e-mail printing function of said image forming apparatus.

17. A non-transitory computer readable recording medium on which a program is recorded, said program being executed in a printing setting apparatus for generating printing setting information described in one data format among plural types of data formats and submitting a printing job to an image forming apparatus capable of executing a printing job based on printing setting information described in said plural types of data formats, said program causing said printing setting apparatus to function as a system comprising a processor configured to:

make a printing setting based on control information input by a user and generating printing setting information described in said one data format based on said printing setting;

convert said printing setting information which is generated by said processor and described in said one data format into printing setting information in another data format which is included in said plural types of data formats; and output said printing setting information which is generated by said processor and described in said another data format.

18. A non-transitory computer readable recording medium on which a program is recorded, said program being executed in a printing setting apparatus for generating printing setting information described in one data format among plural types of data formats and submitting a printing job to an image forming apparatus capable of executing a printing job based on printing setting information described in said plural types of data formats, said program causing said printing setting apparatus to function as a system comprising a processor configured to:

receive printing setting information described in another data format which is included in said plural types of data formats and is different from said one data format;

convert said printing setting information which is received by said processor and described in said another data format into said printing setting information described in said one data format; and add said printing setting information which is generated by said processor and described in said one data format to a printing job, and to submit said printing job to said image forming apparatus.

19. An image forming system comprising:

an image forming apparatus configured to execute a printing job based on printing setting information described in plural types of data formats:

a first printing setting apparatus configured to generate printing setting information described in a first data format included in said plural types of data formats, and to submit a printing job to said image forming apparatus; and a second printing setting apparatus configured to generate printing setting information described in a second data format included in said plural types of data formats, and to submit a printing job to said image forming apparatus, wherein said first printing setting apparatus includes a first processor configured to:

make a printing setting based on control information input by a user, and generating said printing setting information described in said first data format based on said printing setting;

convert said printing setting information which is generated by said first processor and described in said first data format, into said printing setting information described in said second data format; and output said printing setting information which is generated by said first processor and described in said second data format, to said second printing setting apparatus, and said second printing setting apparatus includes a second processor configured to:

receive said printing setting information which is output from said first printing setting apparatus and described in said second data format; and add said printing setting information which is received by said second processor and described in said second data format, to a printing job, and to submit said printing job to said image forming apparatus.

20. An image forming system comprising:

an image forming apparatus configured to execute a printing job based on printing setting information described in plural types of data formats;

a first printing setting apparatus configured to generate printing setting information described in a first data format included in said plural types of data formats, and to submit a printing job to said image forming apparatus; and a second printing setting apparatus configured to generate printing setting information described in a second data format included in said plural types of data formats and to submit a printing job to said image forming apparatus, wherein said first printing setting apparatus includes a first processor configured to:

make a printing setting based on control information input by a user and to generate said printing setting information described in said first data format based on said printing setting; and output said printing setting information which is generated by said first processor and described in said first data format, to said second printing setting apparatus, and said second printing setting apparatus includes a second processor configured to:

receive said printing setting information which is output from said first printing setting apparatus and described in said first data format;

convert said printing setting information which is received by said second processor and described in said first data format, into said printing setting information described in said second data format; and add said printing setting information which is generated by said second processor and described in said second data format, to a printing job, and to submit said printing job to said image forming apparatus.

* * * * *